United States Patent
Schipper et al.

[11] Patent Number: 5,969,595
[45] Date of Patent: Oct. 19, 1999

[54] SECURITY FOR TRANSPORT VEHICLES AND CARGO

[75] Inventors: John F. Schipper, Palo Alto; James Edwin Jones, Jr., San Jose; James M. Janky, Los Altos, all of Calif.

[73] Assignee: Trimble Navigation Limited, Sunnyvale, Calif.

[21] Appl. No.: 08/681,160

[22] Filed: Jul. 22, 1996

[51] Int. Cl.⁶ .................................................. B60R 25/10
[52] U.S. Cl. .................... 340/426; 340/539; 340/988; 342/457
[58] Field of Search .................... 340/988, 426, 340/539, 825.49, 825.36; 342/457, 357; 701/300; 180/287; 307/10.2

[56] References Cited

U.S. PATENT DOCUMENTS

| | | |
|---|---|---|
| 3,961,323 | 6/1976 | Hartkorn . |
| 4,035,765 | 7/1977 | Wenner et al. . |
| 4,651,157 | 3/1987 | Gray et al. ................... 342/457 |
| 4,742,357 | 5/1988 | Rackley ....................... 342/457 |
| 4,750,197 | 6/1988 | Denekamp et al. ........... 340/825.35 |
| 4,818,998 | 4/1989 | Apsell et al. ................. 342/457 |
| 4,844,305 | 7/1989 | McKneely ..................... 224/42.42 |
| 4,891,650 | 1/1990 | Sheffer et al. ................ 342/457 |
| 4,897,642 | 1/1990 | DiLullo et al. ............... 340/825.06 |
| 4,905,271 | 2/1990 | Namekawa .................... 340/825.31 |
| 4,908,606 | 3/1990 | Kevonian ...................... 340/691 |
| 4,908,629 | 3/1990 | Apsell et al. ................. 342/498 |
| 4,983,980 | 1/1991 | Ando ........................... 342/357 |
| 5,003,377 | 3/1991 | Gray et al. ................... 342/457 |
| 5,005,664 | 4/1991 | Hoffmann et al. ............. 180/287 |
| 5,014,206 | 5/1991 | Scribner et al. .............. 342/457 |
| 5,025,253 | 6/1991 | DiLullo et al. ............... 340/988 |
| 5,036,329 | 7/1991 | Ando ........................... 342/357 |
| 5,055,851 | 10/1991 | Sheffer et al. ................ 342/457 |
| 5,059,969 | 10/1991 | Sakaguchi et al. ............ 342/357 |
| 5,081,667 | 1/1992 | Drori et al. .................. 340/426 |
| 5,115,224 | 5/1992 | Kostusiak .................... 340/574 |
| 5,131,019 | 7/1992 | Sheffer et al. . |
| 5,155,491 | 10/1992 | Ando ........................... 342/357 |
| 5,185,761 | 2/1993 | Kawasaki ..................... 342/357 |
| 5,208,756 | 5/1993 | Song ............................ 342/457 |
| 5,218,367 | 6/1993 | Sheffer et al. ................ 342/457 |
| 5,223,844 | 6/1993 | Mansell et al. ............... 342/457 |
| 5,225,842 | 7/1993 | Brown et al. ................. 342/357 |
| 5,289,163 | 2/1994 | Perez et al. ................... 340/573 |
| 5,293,642 | 3/1994 | Lo ............................... 342/457 |
| 5,347,274 | 9/1994 | Hassett ......................... 340/988 |

(List continued on next page.)

OTHER PUBLICATIONS

Tom Logsdon, The Navstar Global Positioning System, Reinhold Van Nostrand Press, 1992, pp. 1–40.

*Primary Examiner*—Brent A. Swarthout
*Attorney, Agent, or Firm*—John F. Schipper

[57] ABSTRACT

Method and apparatus for providing security for a vehicle and for cargo transported on the vehicle. A location determination (LD) system determines vehicle location. A cargo unit carries a transceiver (or transmitter) that transmits a selected signal, either sua sponte or in response to receipt of a polling signal. The selected signal, if received by a receiver on the vehicle, is examined as to signal intensity, signal coding and/or time of receipt. If the received signal violates a selected condition, vehicle location is compared with an approved cargo destination. If the vehicle is not near a cargo destination, or if no selected signal is received at the receiver, an alarm signal is transmitted, which may include the vehicle location and/or the violated condition. If the LD system does not receive adequate LD signals to determine vehicle location, vehicle location coordinates are compared with a coordinate range for a signal obscuring region (SOR). Vehicle location within the SOR can be tracked using a supplemental LD system until the vehicle leaves the SOR. If LD signals are lost for too long, inside or outside an SOR, an alarm signal is transmitted. If vehicle location is outside a travel corridor, if the vehicle does not pass a waypoint, if vehicle velocity is below a low threshold for too long, or if vehicle velocity is above a high threshold, an alarm signal is transmitted. The LD system may be GPS, GLONASS, LORAN or other satellite- or ground-based system.

74 Claims, 9 Drawing Sheets

U.S. PATENT DOCUMENTS

| | | | |
|---|---|---|---|
| 5,349,329 | 9/1994 | Smith | 340/426 |
| 5,374,936 | 12/1994 | Feng | 342/457 |
| 5,379,224 | 1/1995 | Brown et al. | 340/989 |
| 5,398,190 | 3/1995 | Wortham | 340/990 |
| 5,402,347 | 3/1995 | McBurney et al. | 342/357 |
| 5,408,239 | 4/1995 | Endo | 342/352 |
| 5,418,538 | 5/1995 | Lau | 342/357 |
| 5,422,813 | 6/1995 | Schuchman et al. | 342/457 |
| 5,497,149 | 3/1996 | Fast | 340/988 |
| 5,502,641 | 3/1996 | Isomura . | |
| 5,640,139 | 6/1997 | Egeberg | 342/457 |
| 5,648,763 | 7/1997 | Long | 340/825.49 |

SECURITY FOR TRANSPORT VEHICLES AND CARGO

FIELD OF THE INVENTION

This invention relates to use of location determination systems to provide security for transport vehicles and cargo.

BACKGROUND OF THE INVENTION

Diversion or theft of cargo that is being transported by a land, water-borne or air-borne vehicle is still big business. One estimate of the value of cargo that is stolen from land, sea and air vehicles annually is tens of billions of dollars. In some instances, the vehicle and its cargo are diverted, until the cargo can be removed from the vehicle in an undisclosed location, safe from the inquisitive eyes and ears of law enforcement officials. In other instances, the cargo is promptly off-loaded from the original transport vehicle and is either stored at an undisclosed location for some period of time or is immediately transported to one or more other locations for disposal or for some purpose. After the stolen cargo has been missing for at least 8–24 hours, the likelihood of cargo recovery drops dramatically, except for certain unique and easily distinguishable items such as atomic energy fuel and well known art objects. At the same time, it is often difficult to keep track of the location of the original cargo transport vehicle and or to determine whether any portion of the cargo has been off-loaded for storage at, or movement to, an undisclosed location.

Mobile unit tracking, for location of a missing vehicle or person, for monitoring vehicle progress along a given route, for determination that an emergency has occurred, or for similar purposes, is disclosed in U.S. Pat. Nos. 4,651,157 and 5,003,317, issued to Gray et al, U.S. Pat. Nos. 4,818,908 and 4,908,629, issued to Apsell et al, U.S. Pat. Nos. 4,891,650, 5,055,851, 5,131,019 and 5,218,367, issued to Sheffer et al, U.S. Pat. No. 4,905,271, issued to Namekawa, U.S. Pat. No. 5,014,206, issued to Scribner et al, U.S. Pat. No. 5,115,224, issued to Kostusiak, U.S. Pat. No. 5,208,756, issued to Song, U.S. Pat. No. 5,223,844, issued to Mansell et al, U.S. Pat. Nos. 5,225,224 and 5,379,224, issued to Brown et al, U.S. Pat. No. 5,289,163, issued to Perez et al, U.S. Pat. No. 5,293,642, issued to Lo, U.S. Pat. No. 5,347,274, issued to Hassett, U.S. Pat. No. 5,374,936, issued to Feng, U.S. Pat. No. 5,398,190, issued to Wortham, U.S. Pat. No. 5,422,813, issued to Schuchman et al. These patents are incorporated by reference herein.

Cargo security systems, often involving provision of physical resistance or other dissuasion methods to an unauthorized cargo off-loader or cargo diverter, are disclosed in U.S. Pat. No. 3,961,323, issued to Hartkorn, U.S. Pat. No. 4,035,765, issued to Wenner et al, U.S. Pat. No. 4,543,983, issued to Murray, U.S. Pat. No. 4,742,357, Issued to Rackley, U.S. Pat. No. 4,750,197, issued to Denekamp et al, U.S. Pat. No. 4,844,305, issued to McKneely, U.S. Pat. Nos. 4,897,642 and 5,025,253, issued to DiLullo et al, U.S. Pat. No. 4,908,606, issued to Kevonian, U.S. Pat. No. 5,005,664, issued to Harris et al, and U.S. Pat. No. 5,081,667, issued to Drori et al. These patents are incorporated by reference herein.

Use of measured signal strength to estimate the distance of a mobile unit from a plurality fixed transmitters or receivers is disclosed in U.S. Pat. Nos. 4,891,650, 5,055,851 and 5,218,367, issued to Sheffer et al, in U.S. Pat. No. 5,289,163, issued to Perez et al, and in U.S. Pat. No. 5,374,936, issued to Feng. These patents are incorporated by reference herein.

The approaches disclosed in these patents focus on tracking a vehicle for the purpose of resisting off-loading or diversion of cargo from a vehicle, not on integrated tracking and protection of a vehicle and its cargo.

What is needed is an enhanced location determination system that (1) tracks the location of the vehicle and of the cargo relative to the vehicle, (2) reports any out-of-the-ordinary lapses in receipt of signals sufficient to determine the vehicle present location and/or cargo present location, (3) determines when some portion of the cargo is being or has been off-loaded at other than an approved location, (4) determines when the vehicle is within a signal-obstructing region, (5) determines when a vehicle is within a selected travel corridor, (6) determines when the vehicle velocity has been abnormally low for too long a time, and/or (7) transmits an alarm signal, including the last-known location of the vehicle and/or the cargo, if some abnormal event is determined to have occurred. Preferably, this system should have the capabilities of tracking the location of the vehicle and of sensing movement of the cargo independently and should provide substantial flexibility in determining and reporting whether an abnormal event has occurred or is occurring and the type of abnormal event.

SUMMARY OF THE INVENTION

These needs are met by the invention, which provides method and system for providing security for a vehicle and at least one cargo item carried by the vehicle. In one embodiment, cargo that is transported by a vehicle includes a clandestine short distance signal transceiver (signal transmitter and signal sensor/receiver) that communicates with another short distance signal transceiver clandestinely mounted within the vehicle. The vehicle transceiver occasionally or continuously transmits a coded first signal and, in response, receives a second signal from the cargo transceiver. If this second coded signal (1) is not received, or (2) is received at a time outside a designated time window, or (3) is not a coded second signal, or (4) has a second coded signal intensity that falls below a selected threshold intensity, the system concludes that some portion of the cargo is being or has been removed from the vehicle and estimates the location of the vehicle, based on the location of a location determination (LD) system carried on the vehicle. If the vehicle is not located at an approved cargo destination location, the system transmits an alarm signal indicating the vehicle location and the condition(s) that is violated.

In another embodiment, the LD system receives signals from two or more spaced apart, distinguishable LD signal sources and continually determines the vehicle location. If the signal intensity of all the LD signals decreases or disappears abruptly, the LD system determines if the loss of LD signals has continued for a time length $\Delta t(lost)$ greater than a first selected time length $\Delta t1$. If $\Delta t(lost) > \Delta t1$, the system consults an on-board database and determines whether the vehicle is likely to have entered a tunnel, covered bridge, dense wooded areas, urban canyon or other signal-obstructing region (SOR), based upon the vehicle's estimated location. If the vehicle is likely to have entered an SOR, the system determines if the loss of LD signals has continued for a time length $\Delta t(lost)$ greater than a second selected time length $\Delta t2$. If $\Delta t(lost) > \Delta t1$ and the LD antenna location is not within or near an SOR, or if the vehicle is within or near an SOR and $\Delta t(lost) > \Delta t2$, an alarm signal, optionally including the estimated LD antenna location or the vehicle location, is transmitted. Optionally, if the vehicle fails to travel within a selected travel corridor that defines and surrounds the chosen route, of if the vehicle fails to pass through a specified neighborhood of one or more waypoints on the chosen route, or if the vehicle velocity v stays below a low velocity threshold for too long a time, or if the vehicle velocity is above a high velocity threshold, an alarm signal, including the estimated vehicle location, is also transmitted. If a central signal-receiving station receives optionally coded alarm signals, the central station can promptly dispatch local law enforcement representatives or other appropriate personnel to the last reported location of the vehicle.

DESCRIPTION OF BEST MODES OF THE INVENTION

Figure 1:
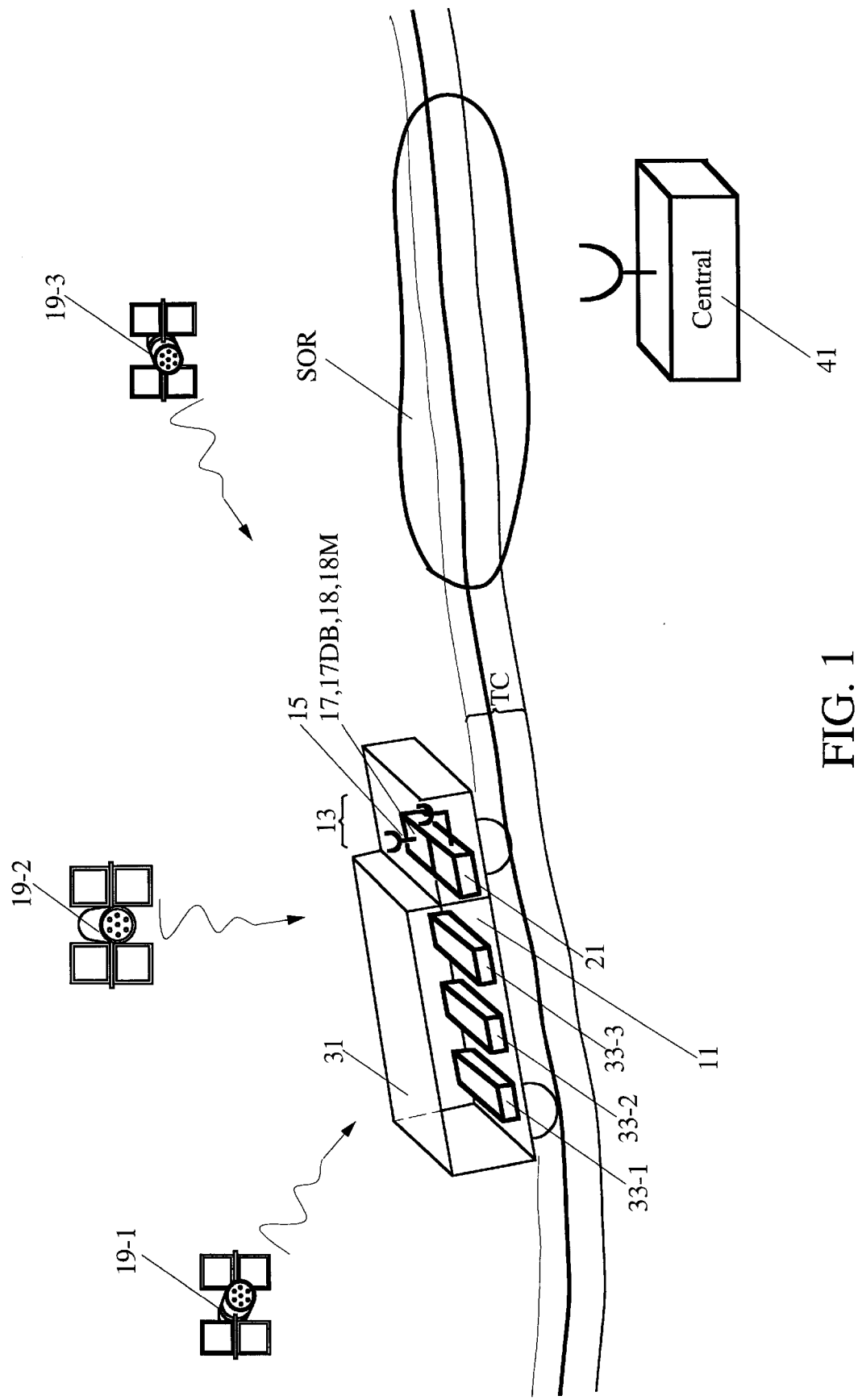
FIG. 1 illustrates a first environment suitable for use of the invention.

FIG. 1 illustrates use of a first embodiment of the invention. A land or water-borne or air-borne vehicle 11 carries one or more cargo units 33-1, 33-2, 33-3. The vehicle 11 is equipped with a vehicle security system 12, including a location determination (LD) system 13, which includes an LD signal antenna 15 and associated LD signal receiver/processor 17 that receives LD signals from two or more LD signal sources 19-1, 19-2, 19-3, such as GPS or GLONASS satellites or land-based signal towers that transmit Loran C, Tacan, Decca or Omega, JTIDS Relnav, PLRS or similar systems, and that determines or estimates the location coordinates of the present location of the LD antenna 15. The LD signal sources 19-1, 19-2, 19-3 are preferably spaced apart from the vehicle 11. The LD receiver/processor 17 includes a computer 18 with a memory 18M that receives and temporarily stores at least one set of recently determined location coordinates for the LD antenna 15. The vehicle 11 also carries a communications transmitter 21 and associated antenna 23 that are electrically connected to the LD receiver/processor 17. Optionally, the vehicle 11 also carries a supplemental LD system 25, such as a dead reckoning system, a magnetic field sensing system or an inertial system, which does not rely upon receipt of electromagnetic waves from spaced apart signal sources, to estimate vehicle location while the vehicle is within an SOR and when the vehicle initially leaves an SOR.

The LD receiver/processor 17 also includes an electronic map or other suitable database 17DB that includes the location coordinates of each approved cargo destination location, at which part or all of the vehicle cargo can be off-loaded. The database 17DB optionally identifies a route or travel corridor TC, or a sequence of one or more waypoints on the route, the vehicle 11 is likely to travel (optional) and that identifies a range of location coordinates that corresponds to each (large) structure, enclosure or other signal-obstructing region (SOR) the vehicle 11 is likely to pass through or pass near to, taking into account likely detour routes, along the planned travel route for the vehicle 11. An SOR for a vehicle may be a pre-identified tunnel, a partly or fully covered bridge, a dense collection of tall trees, a deep cut for a road pass-through or channel pass-through, an urban canyon or other structure or collection of structures that is likely to interfere with receipt of one or more of the LD signals from the LD signal sources 19-1, 19-2, 19-3 by the LD antenna 15 mounted on the vehicle 11. For an air-borne vehicle, vehicle altitude, as well as vehicle latitude and longitude, must be taken into account in determining whether one or more LD signals is shadowed by an SOR structure.

Preferably, the range of location coordinates corresponding to a given SOR includes a greater range than the range of the structure itself and takes account of possible "shadowing" by an SOR structure.

The LD system 13 may occasionally and briefly fail to receive LD signals sufficient in number and in signal quality ("inadequate LD signals") to allow the LD receiver/processor 17 to determine the present location of the LD antenna 15. This failure may occur for any of several reasons having nothing to do with passage of the vehicle 11 through an SOR. The LD receiver/processor 17 includes a timer 17T and allows loss, for a time interval of length $\Delta t(lost)$ no greater than a first selected time increment $\Delta t1$ ($\Delta t1 \approx 1–300$ sec or more), of LD signals that would otherwise be adequate to determination of the present location of the LD antenna 15.

Optionally, if the time length $\Delta t(lost)$ exceeds $\Delta t1$, an indicium is set equal to a selected indicium value and an information signal, including at least one of (1) the indicium value and (2) a most-recently-determined location of the LD antenna 15, is formed. The LD system or the first transceiver 35 causes the transmitter 21 to transmit an alarm signal, including the information signal, to a central station 41. Receipt of an alarm signal causes the central station 41 to initiate a response to a possible attempted diversion of the vehicle 11 and/or the vehicle's contents (cargo).

Optionally, when the LD receiver/processor 17 first senses that it has lost a "lock" on one or more of the LD signals used to determine the present location of the LD antenna 15, the transmitter 21 can promptly transmit an advisory signal, including a most-recently-determined location of the LD antenna, that advises the central station 41 that signal lock has been (temporarily) lost.

Preferably, if $\Delta t(lost) > \Delta t1$, the LD receiver/processor 17 compares a most-recently-determined location of the LD antenna 15 with a range of location coordinates corresponding to at least one SOR, and preferably to all SORs. If the location coordinates of the most-recently-determined location of the LD antenna are not within or near the location coordinates range of one of the SORs, the central station is notified. An indicium is set equal to a second selected value and an information signal, including at least one of (1) the indicium value and (2) the most-recently-determined location of the LD antenna 15, is formed. This information signal is transmitted to the central station 41 by the transmitter 21, as part of an alarm signal.

Optionally, if the location coordinates of the most-recently-determined location of the LD antenna are within or adjacent to the location coordinates range of one of the SORs, the timer 17T continues to accumulate the time length $\Delta t(lost)$ and to compare this time length with a second time increment threshold $\Delta t2$, the time length of a reasonable time interval that is likely to be required for the vehicle 11 to pass through an identified SOR and to recover LD signals after clearing the SOR. The second time increment threshold $\Delta t2$ may be as short as a few seconds and may be as long as a few hundred seconds, depending upon the physical extent of the SOR, the average vehicle velocity as the vehicle 11 moves through or near the SOR, and the LD signal reacquisition time. If the accumulated time $\Delta t(lost)$ becomes greater than $\Delta t2$ and the LD system 13 has not begun receiving LD signals that allow determination of the present location of the LD antenna 15, the central station is notified. An indicium is set equal to a selected third value and an information signal, including at least one of (1) the indicium value and (2) a most-recently-determined location of the LD antenna, is formed. This information signal is transmitted to the central station 41 by the transmitter 21, as part of an alarm signal.

Optionally, the supplemental LD system 25 is used to estimate the vehicle location while the LD antenna location is within an SOR, and for a short time after the LD antenna 15 and/or the vehicle 11 leave the SOR. The timer 17T continues to accumulate the time length $\Delta t(lost)$. If the supplemental LD system indicates that the LD antenna 15 and vehicle 11 have left the SOR for a time interval of length greater than $\Delta t1$, or greater than some other selected positive time increment $\Delta t1'$ representing signal reacquisition time, and the LD antenna has not yet begun to receive adequate LD signals that allow the LD system 13 to determine the present location of the LD antenna, the central station is notified. An indicium is set equal to a selected fourth value and an information signal, including at least one of (1) the indicium value and (2) the present location or a most-recently-determined location of the LD antenna, is formed. This information signal is transmitted to the central station 41 by the transmitter 21, as part of an alarm signal.

Optionally, a travel corridor TC surrounding or coinciding with part or all of the route the vehicle is expected to travel can be included in the database 17DB, and the LD antenna location coordinates can be compared, at selected If the LD antenna location is not within the travel corridor TC, the central station is notified. An indicium is set equal to a selected fifth value, and an information signal, including at least one of (1) the indicium value and (2) the present location or a most-recently-determined location of the LD antenna, is formed. This information signal is transmitted to a central station 41 by the transmitter 21, as part of an alarm signal.

Alternatively, the location(s) of one or more waypoints along the route is selected, and the vehicle is optionally required to pass within a selected distance d2 of each specified waypoint, preferably within a selected waypoint time window. If the vehicle does not pass within the distance d2 of a specified waypoint, an indicium is set equal to a selected sixth value and an information signal, including at least one of (1) the indicium value and (2) the present location or a most-recently-determined location of the LD antenna, is formed. This information signal is transmitted to a central station 41 by the transmitter 21, as part of an alarm signal.

The LD receiver/processor 17 or the supplemental LD system 25 can estimate a velocity magnitude v for the LD antenna 17 at selected times, using two or more LD antenna location coordinate sets and the computed difference in times for computation of these location coordinate sets or some other data. Optionally, the system compares the velocity magnitude v with a selected low velocity threshold v(lowvel). If v<v(lowvel) for a continuous time interval of length at least equal to a selected positive time increment $\Delta t4$, this indicates that the vehicle has been substantially stopped for this time interval. An indicium is set equal to a selected seventh value, and an information signal, including at least one of (1) the indicium value and (2) the present location or a most-recently-determined location of the LD antenna, is formed. This information signal is transmitted to a central station 41 by the transmitter 21, as part of an alarm signal.

Optionally, when the vehicle velocity has a magnitude v that is greater than a selected high velocity threshold v(highvel), which is at least as large as the maximum velocity at which the vehicle can travel, this may indicate that the LD antenna 15 is receiving spoofing signals that attempt to mask the true location of the LD antenna, or that the LD system 13 is malfunctioning. An indicium is set equal to a selected eighth value, and an information signal, including at least one of (1) the indicium value and (2) the present location or a most-recently-determined location of the LD antenna, is formed. This information signal is transmitted to a central station 41 by the transmitter 21, as part of an alarm signal.

The different values of the indicium, optionally contained in the information signal, indicate that different conditions are violated in movement of the vehicle 11. Two or more of the first, second, third, fourth, fifth, sixth, seventh and eighth indicium values may be the same, if this condition violation information is not important in the alarm signal. Alternatively, as many as eight separate indicia can be used here, one for each of the first, second, third, fourth, fifth, sixth, seventh and eighth indicium values. One advantage of this alternative approach to provision of indicium values is that violation of two or more of the above-discussed eight conditions can be indicated in the information signal.

The LD system may be a satellite-based system, such as the Global Positioning System (GPS) or the Global Orbiting Navigational Satellite System (GLONASS), or may be a ground-based system such as LORAN-C, Tacan, Decca, Omega, JTIDS Relnav or Position Location Reporting Service (PLRS). These LD systems are discussed in Tom Logsdon, *The Navstar Global Positioning System*, Reinhold Van Nostrand Press, 1992, pp. 1–40.

The receiver/processor 17 and/or database 17DB preferably includes an estimate of a time length $\Delta t(reacquire)$ of a reasonable or maximum time interval required for the LD system 13 to reacquire LD signals that are adequate for location determination, after the LD system has again begun to receive the LD signals. The time interval length $\Delta t(reacquire)$ may be as short as 1–45 sec and may be as long as 180–300 sec or longer, if GPS signals are being used for location determination. LD signal (re)acquisition requires that the LD signals be received, that the signals have adequate signal definition and that these signals be recognized and distinguished by the LD system 13. Mere receipt of LD signals, without more, is usually insufficient to allow location determination.

The process of LD signal receipt and acquisition from GPS satellites, and some of the difficulties of (re)acquiring a signal after power-up or after signal interruption by passage through an SOR, are discussed by Ando in U.S. Pat. Nos. 4,983,980, 5,036,329 and 5,155,491, by Sakaguchi et al in U.S. Pat. No. 5,059,969, by Kawasaki in U.S. Pat. No. 5,185,761, by McBurney et al in U.S. Pat. No. 5,402,347, by Endo in U.S. Pat. No. 5,408,239, by Lau in U.S. Pat. No. 5,418,538, and by Isomura in U.S. Pat. No. 5,502,641. These patents are incorporated by reference herein.

Figure 2:
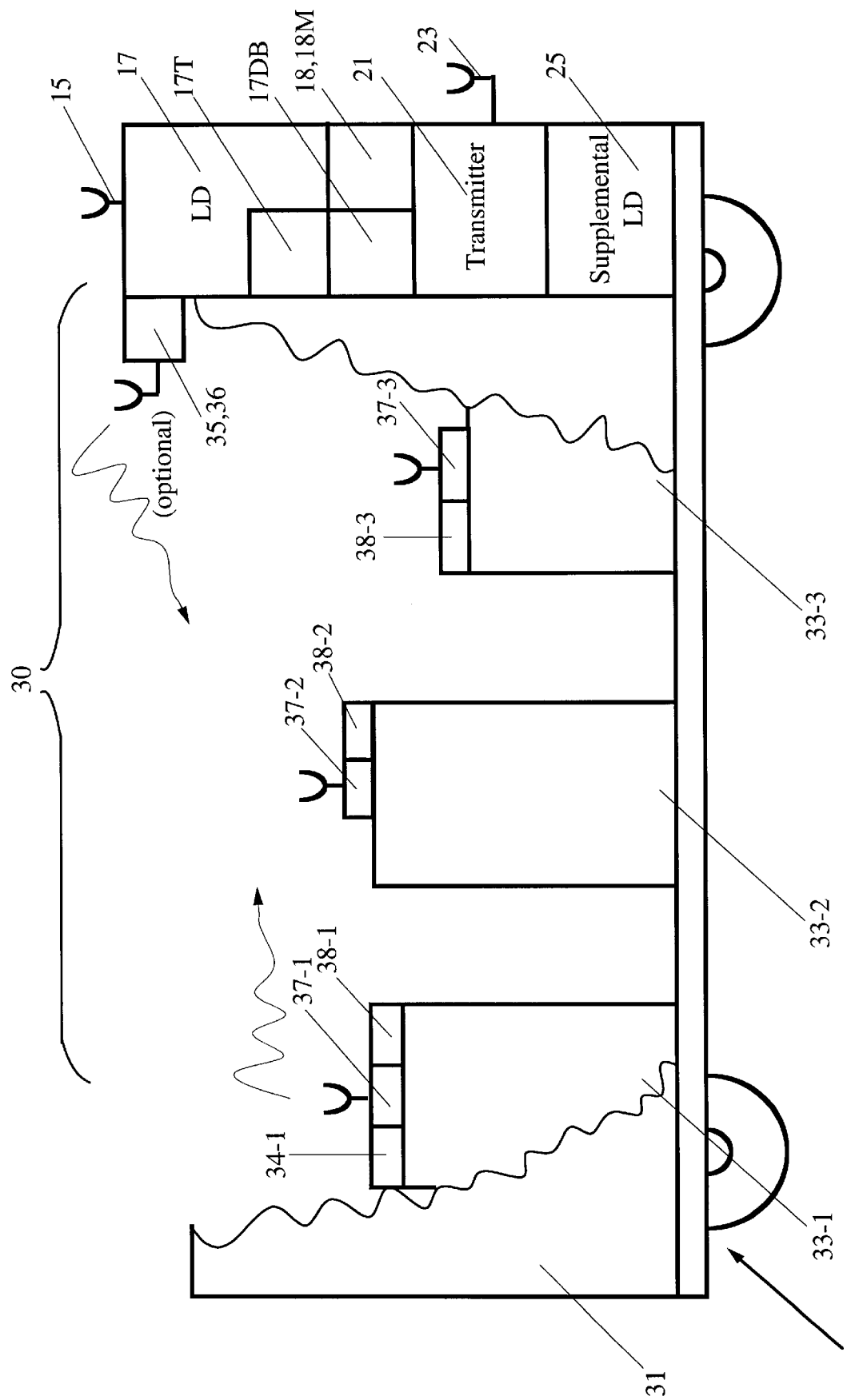
FIG. 2 illustrates one embodiment of the invention for use within a vehicle cargo container.

FIG. 2 illustrates use of one embodiment of the invention, including a cargo interrogation system 30 within a cargo-carrying volume or container 31, applied to cargo that is carried on the vehicle 11. The vehicle 11 also carries the communications transmitter or transceiver 21, an associated communications antenna 23, and a first short distance signal transceiver 35 that is electrically connected to the LD receiver/processor 17. One or more cargo units 33-x (x=1, 2, 3) transported by the vehicle 11 in the container 31 carries a second short distance signal transceiver 37-x that communicates with the first transceiver 35, using coded first and second transceiver signals. The first transceiver 35, and similarly a second transceiver 37-x, is a signal transmitter and signal sensor/receiver: (1) that transmits a selected, preferably low intensity, coded first signal over a short distance d1, such as a maximum of 10–60 feet, within or adjacent to the cargo container 31 at a selected time; (2) that can receive, in response, a low intensity, second signal (preferably also coded), also transmitted over a short distance; (3) that optionally determines when the intensity I of the response signal is below a selected intensity threshold $I_{thr}$; (4) that optionally determines whether a response signal is received within a selected time window, determined with reference to the selected time the coded first signal was transmitted; and (5) that optionally determines whether this response signal is an expected coded second signal.

The first transceiver 35 preferably has an independent power supply 36, and the second transceiver 37-x preferably has an independent power supply 38-x; and neither of these power supplies can be reached without disabling the corresponding transceiver and/or its power supply. Each of the first and second transceiver 35 and 37-x and its associated power supply 36 and 38-x is preferably clandestinely mounted so that its presence, location and purpose are undisclosed and not determinable by visual observation or by straightforward electronic monitoring.

The selected signal may be transmitted by the second transceiver 37-x at (1) at one or more times that are fixed by programming of the second transceiver 37-x, (2) at one or more times that are determined by the time of receipt of a "polling" signal from the first transceiver 35 that are determined by programming of the second transceiver 37-x, (3) at one or more times in a periodic or aperiodic time sequence, or (4) continuously over a selected time interval. Continuous transmission of the selected signal by the second transceiver 37-x will require provision of a larger associated power supply 38-x. Optionally, the selected signal may be continuously transmitted using a frequency hopping or other spread spectrum technique in which the frequency or another transmission attribute of the selected signal changes rapidly and unpredictably, to suppress or eliminate the possibility of use of a false or "spoofing" signal to supplant the bona fide selected signal transmitted by the second transceiver 37-x.

Alternatively, for suitably packaged cargo packages in the cargo unit 33-x, the second transceiver 37-x and/or its associated power supply 38-x can be camouflaged or otherwise (re)packaged to resemble a cargo package in the cargo unit 33-x. This approach would be appropriate, for example, if the cargo unit 33-x includes packages of computer RAM memory chips or watches or other relatively high value goods. Preferably, the cargo package that includes the second transceiver 37-x and associated power supply 38-x should not call attention to itself visually and should be transported by a cargo diverter or thief along with the remainder of the cargo packages in the cargo unit 33-x. Alternatively, the second transceiver 37-x and/or power supply 38-x can be built into and camouflaged as part of the exterior packaging for the cargo unit 33-x.

The first transceiver 35 transmits a coded first signal at a selected time. If a signal is received by the second transceiver 37-x, the second transceiver examines the signal and determines if this signal is a coded first signal—a signal including coding that is recognized and expected by the second transceiver. If this signal is not a coded first signal, the second transceiver 37-x ignores or rejects the signal. Thus, receipt of extraneous signals, and of false signals transmitted by would-be diverters of the cargo and/or the vehicle, provoke no response from the second transceiver 37-x. Receipt of a false signal will not cause the second transceiver 37-x to disclose its location and/or signal format.

Alternatively, the first transceiver 35 and second transceiver 37-x can be replaced by a vehicle receiver and a cargo transmitter, respectively, and the cargo transmitter 37-x can transmit a confirmation signal at a deterministically selected or randomly selected time without receipt of a polling signal from the first transceiver 35 (now replaced by a vehicle receiver 35). In this alternative approach, the cargo transmitter 35 transmits the confirmation signal (1) at one or more fixed times in a periodic or aperiodic sequence determined by programming of the cargo transmitter 37-x, (2) at one or more random times within a time window of selected length, using a random transmission time generator that may be part of the cargo transmitter, or (3) continuously within a selected time interval.

One or more cargo units 33-x is provided with the second transceiver 37-x, and the first transceiver 35 can communicate with each second transceiver using TDMA, FDMA or CDMA communications to distinguish one interrogated cargo unit from another. The first and second transceivers 35 and 37-x are first tested together, preferably before the vehicle leaves a cargo origin or a cargo destination, to determine that each transceiver is working, that each is initialized properly, and that the two transceivers communicate with each other.

If the second transceiver 37-x receives a coded first signal, as expected, the second transceiver responds by transmission of a second signal, preferably having a selected low intensity I, which may be chosen from a range of intensities. Optionally, the first transceiver 35 can examine a received signal and determine if the received signal intensity I satisfies $I \geq I_{thr}$, where $I_{thr}$ is a selected threshold intensity, and can ignore this received signal if the answer is "no." Because of signal scattering, absorption and attenuation, the second signal intensity I would be chosen to be somewhat greater than $I_{thr}$, in a range such as $I_{thr} < I \leq 2\, I_{thr}$.

If the first transceiver 35 receives a signal, after transmission of a coded first signal, but (A) the received signal intensity satisfies $I < I_{thr}$, the first transceiver 35 optionally concludes that (1) the received signal was not transmitted by the second transceiver 37-x or (2) the received signal is a second signal transmitted by the second transceiver, but the second transceiver is too far away to provide a second signal with the required signal intensity at the first transceiver. In this instance, the first transceiver 35 sets an indicium equal to a first selected indicium value. An information signal, including at least one of (1) the indicium value and (2) the present location (if available) or a most-recently-determined location of the LD antenna 15, is formed. This information signal is transmitted to the central station 41 by the transmitter 21, as part of an alarm signal.

Optionally, the second signal can be transmitted in a selected time window, defined with reference to the time of transmission or receipt of the coded first signal or polling signal. This time window can be of specified finite extent, such as $t0+\Delta t(\text{window};1) \leq t \leq t0+\Delta t(\text{window};2)$, where the coded first signal is received at time $t=t0$ and $0 \leq \Delta t(\text{window};1) \leq \Delta t(\text{window};2)$. Alternatively, this time window can have infinite extent, such as $t0+\Delta t(\text{window};3) \leq t < \infty$. The first transceiver 35 can examine a signal received after the first transceiver has transmitted a coded first signal and determine if this received signal is received within a selected time window, and can ignore this received signal if the answer is "no."

If (B) the received signal is received by the first transceiver 35 outside the selected time window, after transmission of the coded first signal, the first transceiver optionally concludes that (1) the second signal was not transmitted, or (2) the received signal was not transmitted by the second transceiver 37-x in response to receipt of the coded first signal, or (3) at least one of the transceivers is malfunctioning. In this instance, the first transceiver 35 sets an indicium equal to a second selected indicium value. An information signal, including at least one of (1) the indicium value and (2) the present location (if available) or a most-recently-determined location of the LD antenna 15, is formed. This information signal is transmitted to the central station 41 by the transmitter 21, as part of an alarm signal.

The first transceiver 35 may also function as the transmitter 21, in order to simplify the exchange of information.

Optionally, the second signal includes a coded portion, coded by the format used and/or in the coding language used and/or by inclusion of a coding indicium in the second signal. The coding used in this second signal may be set by prearrangement or, preferably, may be specified by the coded first signal. The first transceiver 35 can examine a signal received after the first transceiver has transmitted a coded first signal and determine if this received signal is a coded second signal, with specified coding, and can ignore the received signal if the answer is "no."

If (C) the received signal is not a coded second signal and no coded second signal is received, after transmission of the coded first signal, the first transceiver optionally concludes that (1) the coded second signal was not transmitted or (2) the received signal was not transmitted by the second transceiver in response to receipt of the coded first signal or (3) at least one of the first and second transceivers is malfunctioning. In this instance, the first transceiver 35 sets an indicium equal to a third selected indicium value. An information signal, including at least one of (1) the indicium value and (2) the present location (if available) or a most-recently-determined location of the LD antenna 15, is formed. This information signal is transmitted to the central station 41 by the transmitter 21, as part of an alarm signal.

The different values of the indicium, optionally contained in the information signal, indicate that different conditions (A), (B) and/or (C) are violated in the communications between the first transceiver 35 and the second transceiver 37-x. Two or more of the first, second and third selected indicium values may be the same, if this condition violation information is not important in the alarm signal. Alternatively, as many as three separate indicia can be used here, one for each of the first, second and third selected indicium values. One advantage of this alternative approach to provision of indicium values is that violation of two or more of the above-discussed three conditions can be indicated in the information signal.

Optionally, the cargo container 31 includes a container locking mechanism 32 that is (re)locked after cargo is loaded and that does not permit the cargo container to be (re)opened unless the LD system 13 determines that the LD antenna has arrived at, or is within a selected distance d1 of, an approved cargo destination.

Optionally, at least one cargo unit 33-x carries a "cargo bomb" 34-x that can be activated when the vehicle 11 or LD antenna 15 leaves a cargo origin or leaves a cargo destination and can be deactivated when the vehicle or the LD antenna arrives at an approved cargo destination. If a cargo unit 33-x carrying an activated cargo bomb 34-x is opened or, optionally, moved so that one or more of the conditions (A), (B) and (C) is violated, when the vehicle 11 or LD antenna 15 is not at an approved cargo destination, the cargo bomb 34-x will automatically "detonate" and (1) spray noxious fumes or indelible liquid or an indelibly smelly substance on all persons and objects near that cargo unit and/or (2) emit a high intensity audible signal or sound that is immediately sensed by anyone within hearing distance of the cargo bomb and/or (3) transmit a high intensity, inaudible tracking signal that can be used to determine the present location of the cargo bomb by triangulation. Activation, deactivation and/or detonation of the cargo bomb 34-x can be controlled by the first transceiver 35 or by the second transceiver 37-x.

Figure 3A:
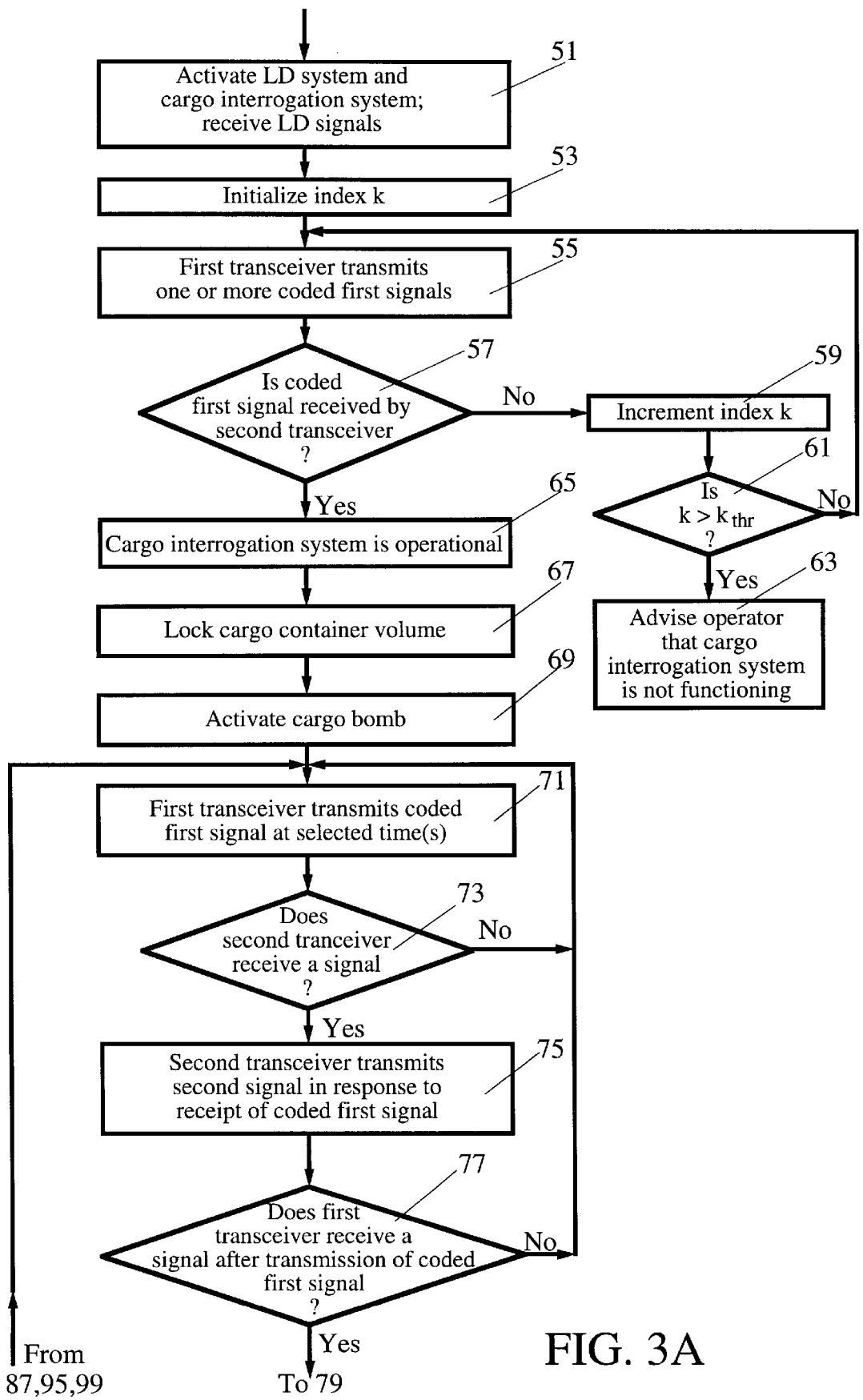
FIGS. 3A/3B, 4A/4B and 5 are flow charts illustrating suitable procedures for providing cargo security and vehicle security, respectively, according to the invention.
Figure 3B:
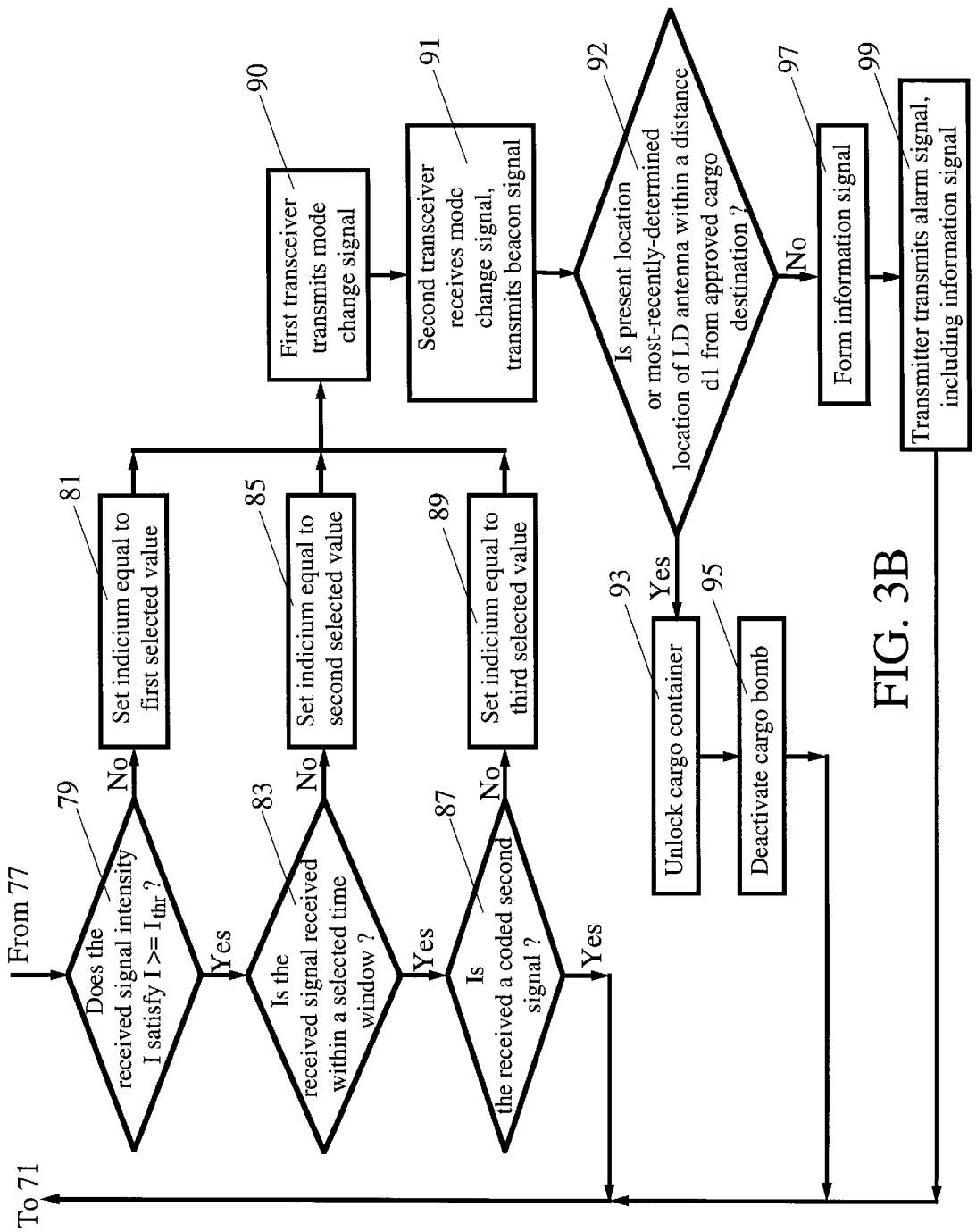

FIGS. 3A and 3B illustrate, in flow chart form, a suitable procedure according to another embodiment of the invention, for cargo security. In step 51, the LD system and the cargo interrogation system are activated, and the LD antenna and receiver/processor begin to receive and process LD signals.

Optionally, at this point, the cargo interrogation system 30 initially tests itself to determine if this system is working. In step 53, a counting index k is initialized to k=0. In step 55, the first (vehicle-mounted) transceiver transmits (or believes it transmits) a sequence of coded first signals, at selected times. In step 57, the second (cargo-mounted) transceiver determines if it has received a coded first signal? If the answer to the question in step 57 is "no," the system increments the index k (k→k+1) in step 59. In step 61, the system determines if k is greater than a selected positive threshold value $k_{thr}$? If the answer to the question in step 61 is "no," the system recycles to step 55 and awaits (putative) transmission of another coded first signal by the first transceiver. If the answer to the question in step 61 is "yes," the system concludes that the cargo interrogation system, including one or both of the first and second transceivers, is not working. The vehicle operator is advised of possible transceiver malfunction in step 63. If the answer to the question in step 57 is "yes," the cargo interrogation system concludes that it is operational, in step 65. Preferably, steps 53, 55, 57, 59, 61, 63 and/or 65 are performed at a cargo origin location and at each approved cargo destination location along the route, until the final cargo destination is reached.

Assume that the cargo interrogation unit either is not tested or is tested and passes the transceiver operation test set forth in steps 53–65. Optionally, the cargo container is locked, in step 67. Optionally, one or more "cargo bombs" associated with the cargo units is activated, in step 69. The vehicle departs and travels toward an approved cargo destination.

In step 71, the first transceiver transmits a coded first signal. In step 73, the system determines if the second transceiver has received a coded first signal? If the answer to the question in step 73 is "no," the second transceiver recycles to step 71 and awaits receipt of a signal.

If the answer to the question in step 73 is "yes," the second transceiver responds, in step 75, by transmitting a second signal, optionally with a selected low intensity. Optionally, the second signal may be transmitted in a selected time window, where the beginning point and ending point of the selected time window are preferably defined with reference to the time the first transceiver transmits the coded first signal. Optionally, the second signal may be coded.

After transmission of the coded first signal, the first transceiver determines, in step 77, if the first transceiver has received a signal after such transmission? If the answer to the question in step 77 is "no," the first transceiver recycles to step 71 and awaits receipt of a signal.

If the answer to the question in step 77 is "yes," the system optionally determines, in step 79, if the received signal intensity I satisfies $I \leq I_{thr}$? If the answer to the question in step 79 is "no," the system sets an indicium equal to a first selected value in step 81 and proceeds to step 90.

If the answer to the question in step 79 is "yes," the system determines, in step 83, if the received signal was received within a selected time window? If the answer to the question in step 83 is "no," the system sets an indicium equal to a second selected value in step 85 and proceeds to step 90. Optionally, this includes a situation where no acceptable second signal is received.

If the answer to the question in step 83 is "yes," the system determines, in step 87, if the received signal is a coded second signal? If the answer to the question in step 87 is "no," the system sets an indicium equal to a third selected value in step 89 and proceeds to step 90. The pairs of steps 79 and 81, 83 and 85, and 87 and 89 can be performed in any order.

If the answer to the question in step 87 is "yes," the system recycles to step 71 to await receipt of another coded first signal at another selected time from the first transceiver.

In step 90, the first transceiver (or vehicle receiver) 35 transmits a mode change signal of higher signal strength that is received and acted upon by the second transceiver (or cargo transmitter) 37-x. In step 91, the low power mode of the second transceiver (or cargo transmitter) 37-x is converted to a higher power mode, and the transceiver/transmitter 37-x begins to continuously or intermittently transmit a beacon signal that can be received at greater distances from the vehicle 11, as long as the power supply 38-x holds out. This beacon signal is optionally coded and can be received at two or more nearby central stations and used to estimate the present location of the transceiver/transmitter 37-x by triangulation. The system then proceeds to step 92.

In step 92, which is only reached if at least one of the three conditions (A), (B) and (C) for cargo interrogation is violated, the cargo interrogation system queries the LD system to determine if the LD antenna is within a selected distance d1 of an approved cargo destination? If the answer to the question in step 92 is "yes," the cargo interrogation system (1) optionally unlocks the cargo container volume in step 93, (2) optionally deactivates the cargo bomb(s) in step 95, and (3) recycles to step 71 to await receipt of another coded first signal at another selected time. The cargo interrogation system is optionally deactivated while the LD antenna or the vehicle is at an approved cargo destination.

Step 95 can be deleted or postponed, and a cargo bomb 34-x can remain in its activated state, until the corresponding cargo unit 33-x is actually off-loaded at its approved cargo destination by an approved cargo off-loader. This will suppress or eliminate the possibility of diversion or theft of the cargo unit 33-x while the vehicle 11 is parked or waiting at an approved cargo destination.

If the answer to the question in step 92 is "no," the cargo interrogation system concludes that cargo is being or has been off-loaded at an unauthorized location. An information signal is formed, including at least one of (1) the indicium value(s) and (2) the present location (if available) or a most-recently-determined location of the LD antenna, is formed in step 97. In step 99, the transmitter transmits an alarm signal, including the information signal, to the central station. Optionally, after performing step 99 the cargo interrogation system can recycle to step 71 to await receipt of another coded first signal at another selected time.

Step 97 can be placed before step 92. Alternatively, steps 81, 85, 89 and/or 97 can be placed after step 92.

In a first alternative to the embodiment illustrated in FIGS. 3A and 3B, steps 83, 85, 87 and 89 are deleted, and the only condition is that the received signal intensity I satisfy $I \geq I_{thr}$.

In a second alternative to the embodiment illustrated in FIGS. 3A and 3B, steps 79, 81, 87 and 89 are deleted, and the only condition is that the received signal be received within the selected time window. This condition is violated if no signal is received, and if the only signals received are received outside the selected time window.

In a third alternative to the embodiment illustrated in FIGS. 3A and 3B, steps 79, 81, 83 and 85 are deleted, and the only condition is that the received signal be a coded second signal.

In a fourth alternative to the embodiment illustrated in FIGS. 3A and 3B, steps 87 and 89 are deleted. The received signal intensity I must satisfy $I \geq I_{thr}$, and the received signal must be received within the selected time window.

In a fifth alternative to the embodiment illustrated in FIGS. 3A and 3B, steps 83 and 85 are deleted. The received signal intensity I must satisfy $I \geq I_{thr}$, and the received signal must be a coded second signal.

In a sixth alternative to the embodiment illustrated in FIGS. 3A and 3B, steps 79 and 81 are deleted. The received signal must be received within the selected time window, and the received signal must be a coded second signal.

In a seventh alternative, steps 90 and 91 are deleted, and the system proceeds directly from step 81, 85 or 89 to step 92.

In FIGS. 3A and 3B, three separate indicia can used in steps 81, 85 and 89. One method of implementing this approach is to provide a three-bit omnibus indicium, (b1, b2,b3), with a selected initial value such as (0,0,0). The bit b1, b2 and b3 is set equal to 1 if the answer to the question in step 79, in step 83 and in step 87 is "no," "no" and "no," respectively.

Alternatively, the three separate indicia appearing in step 81, 85 and 89 may be replaced by a single indicium or by two indicia. Initially, this (single) indicium preferably has a value that differs from the first, second and third selected indicium values. Two or more of the first, second and third selected indicium values may be the same, or each of these three selected indicium values may be different. If the three selected indicium values are different from each other, the central station may examine the selected indicium value(s), if transmitted, to determine what event(s) or condition violation(s) caused transmission of the alarm signal. If three different values of the indicium are to be provided (initial value and three selected values), a two-bit signal, with four possible states, representing the indicium will suffice here.

Optionally, at infrequent times, t=t(change), the first transceiver 35 in FIG. 2 includes a command or first coding indicium in the coded first signal that causes the second transceiver 37-x to change the second signal coding, the second signal format and/or a second coding indicium used in the responding second signal. This change in the second signal may be implemented immediately ($t \geq t(change)$) or may be implemented during a specified time interval, given by t(change)+$\Delta$t1(change)$\geq$t$\geq$t(change)+$\Delta$t2(change), with $\Delta$t2(change)>$\Delta$t1(change)$\geq$0), which may be indicated as part of a preceding coded first signal. Preferably, both the commanded coding change and the commanded time interval length $\Delta$t2(change) $\Delta$t1(change)–are changed by the coded first signal in an unpredictable manner. If the second transceiver does not respond with the correct coded second signal in a specified time interval, the question in step 87 in FIGS. 3A/3B is answered "no."

If the received second transceiver signal has an intensity I<$I_{thr}$, this indicates that the cargo unit 33-x carrying the responding second transceiver 37-x has been moved more than a permitted pre-selected distance d(max) away from the first transceiver 35. If the distance d(max) is greater than or equal to the diameter d(vehicle) of the vehicle cargo container 31, non-receipt by the first transceiver of a coded second signal within a selected time window, or receipt of a second coded signal with signal intensity I<$I_{thr}$, indicates that the cargo unit 33-x is being removed, or has been removed, from the vehicle cargo container. The LD receiver/processor 17 consults the database 17DB to determine whether the vehicle location coordinates for the present location or for a most-recently-determined location of the LD antenna 15 agree, within a permitted small distance or statistical variation d1, with the location coordinates for an approved destination for the interrogated cargo unit. If agreement is not found, the transmitter 21 transmits an alarm signal, including the information signal.

The LD antenna 15 and LD receiver/processor 17 must continue to receive a sufficient number of distinguishable LD signals with acceptable signal definition and must maintain "lock" on these LD signals, in order to continue to track the present location of the LD antenna. Assume that the LD system 13 receives fewer than the required number of distinguishable LD signals (e.g., two), or that signal definition for one or more of the LD signals relied upon is degraded so that this LD signal is unusable. Optionally, if the LD system 13 loses lock on one or more of these LD signals, accumulation of a lost signal time increment $\Delta$t(lost) begins. An indicium is set equal to a first selected value, and an information signal, including at least one of (1) the indicium value(s) and (2) a most-recently-determined location of the LD antenna 15, is formed. The transmitter 21 transmits an alarm signal, including the information signal, to the central station 41.

Optionally, the transmitter transmits an advisory signal to the central station as soon as inadequate LD signals are being received to allow the LD system to determine the present location of the LD antenna.

Optionally, if the LD system 13 loses lock on one or more of these signals, for a time interval of length $\Delta$t(lost) greater than a first selected time length $\Delta$t1 (e.g., 1–180 sec), the LD system 13 compares the most-recently-determined location coordinates of the LD antenna 15 with the range of location coordinates for each SOR. If the LD antenna location coordinates does not fall within one of these SOR coordinates ranges, the LD system 13 concludes that the vehicle 11 is being diverted. An indicium is set equal to a second selected value and an information signal, including at least one of (1) the indicium value(s) and (2) a most-recently-determined location of the LD antenna 15, is formed. The transmitter 21 transmits an alarm signal, including the information signal, to the central station 41.

If the LD antenna location coordinates fall within one of the SOR coordinate ranges, the LD system 13 concludes that the vehicle 11 is passing through or near an SOR. Optionally, a supplemental LD system 25 is activated to estimate the location of the vehicle 11 within the SOR and for a time interval after the vehicle leaves the SOR. Preferably, the supplemental LD system 25 does not relay upon receipt of electromagnetic signals from LD sources that are spaced apart from the vehicle 11 so that an estimate of vehicle location may be made even if the vehicle is passing through a tunnel, a covered bridge or other similar enclosure. The supplemental LD system 25 estimates a time t(clear) at which the vehicle 11 "clears" or leaves the SOR and begins to accumulate a clearing time $\Delta$t(clear) between t=t(clear) and the time adequate LD signals (from the original LD signal sources) are being received to allow determination of the present location of the LD antenna 15 again. If $\Delta$t(clear) becomes greater than a selected threshold time increment $\Delta$t3 before adequate LD signals are being received to allow determination of the present location of the LD antenna 15 again, the LD system concludes that the vehicle is being diverted or stopped without authorization. An indicium is set equal to a third selected value and an information signal, including at least one of (1) the indicium value(s) and (2) a most-recently-determined location of the LD antenna 15, is formed. The transmitter 21 transmits an alarm signal, including the information signal, to the central station 41.

Each SOR has an associated time length with a selected time length $\Delta$t2 (e.g., 5–300 sec), during which LD signals may not be received because of interference from a structure or enclosure within the SOR or because of a time delay for the required LD signal reacquisition after the vehicle leaves the SOR. Optionally, if the continuous time interval, during which adequate LD signals are not available to allow location determination, has a length $\Delta$t(lost) greater than a selected time increment $\Delta$t2 for this SOR, the LD system 13 concludes that the vehicle is being diverted or stopped without authorization. An indicium is set equal to a fourth selected value and an information signal, including at least one of (1) the indicium value(s) and (2) a most-recently-determined location of the LD antenna 15, is formed. The transmitter 21 transmits an alarm signal, including the information signal, to the central station 41.

The vehicle 11 receives LD signals (assumed to be adequate here), continually determines its present location and stores this present location information at selected time intervals, such as once every 1–600 sec. Optionally, if the present location of the LD antenna moves outside a preselected vehicle travel corridor TC in FIG. 1 (including possible detour routes) without prior approval, the system concludes that the vehicle is being diverted. An indicium is set equal to a fifth selected value and an information signal, including at least one of (1) the indicium value(s) and (2) the present location (if available) or a most-recently-determined location of the LD antenna 15, is formed. The transmitter 21 transmits an alarm signal, including the information signal, to the central station 41.

Mathematical description of a travel corridor TC, by a collection of location coordinates that define the travel corridor, is set forth in a related patent application entitled "Improvements In Monitoring Of Route And Schedule Adherence," U.S. Ser. No. 08/285,130, assigned to the assignee of this application.

Optionally, the location coordinates of each a sequence of one or more waypoints along the route is selected, and a selected distance d2 and a selected waypoint time window is assigned to each such waypoint. As the LD antenna 15 carried on the vehicle 11 passes within a distance d2 of a selected waypoint along the route, the LD system 13 notes this event and notes the time of observation of such event.

If the LD antenna 15 does not pass the selected waypoint within the selected waypoint time window, or before the end of the selected waypoint time window, the system concludes that the vehicle is either delayed or is being diverted or stopped without authorization. An indicium is set equal to a sixth selected value and an information signal, including at least one of (1) the indicium value(s) and (2) the present location (if available) or a most-recently-determined location of the LD antenna 15, is formed. The transmitter 21 transmits an alarm signal, including the information signal, to the central station 41.

The LD system 13 optionally tracks movement of the vehicle 11 and cargo units 33-x within or outside the approved travel corridor TC, by continual determination of the present vehicle velocity v. If the vehicle velocity v is below a selected velocity threshold v(lowvel), such as 30–300 cm per minute, for a threshold time $\Delta t4$, such as 10–300 sec, the system concludes that vehicle motion is substantially arrested. The central station 41 can then determine whether this arrest of motion is due to (1) an accident or other travel obstruction affecting the vehicle 11, (2) delay due to vehicle operator meal break or personal needs break, or (3) other unexplained causes. If the cause of such arrest of motion is unexplained, the central station 41 optionally treats this event as an alarm condition. An indicium is set equal to a seventh selected value and an information signal, including at least one of (1) the indicium value(s) and (2) the present location (if available) or a most-recently-determined location of the LD antenna 15, is formed. The transmitter 21 transmits an alarm signal, including the information signal, to the central station 41.

If the vehicle velocity v, as estimated by the LD system 13 from vehicle location at successive observation times, is greater than a high velocity threshold v(highvel), such as the maximum vehicle velocity, the system optionally concludes that spoofing signals may be presented in an attempt to conceal or change the present location of the LD antenna 15. An indicium is set equal to an eighth selected value and an information signal, including at least one of (1) the indicium value(s) and (2) the present location (if available) or a most-recently-determined location of the LD antenna 15, is formed. The transmitter 21 transmits an alarm signal, including the information signal, to the central station 41.

FIGS. 3A/3B illustrate an approach where a polling signal is transmitted by the first transceiver 35 in order to elicit a response transmission from the second transceiver 37-x. In an alternative approach, discussed in connection with FIG. 2, the first transceiver 35 and second transceiver 37-x in FIG. 2 are replaced by a vehicle receiver 35 and by a cargo transmitter 37-x, respectively, and no polling signal is required. In this alternative approach, the cargo transmitter 37-x transmits a selected confirmation signal, confirming the continued presence of the cargo unit 33-x, either continuously or in a periodic or aperiodic time sequence of one or more times, based on programming of the cargo transmitter.

Figure 4A:
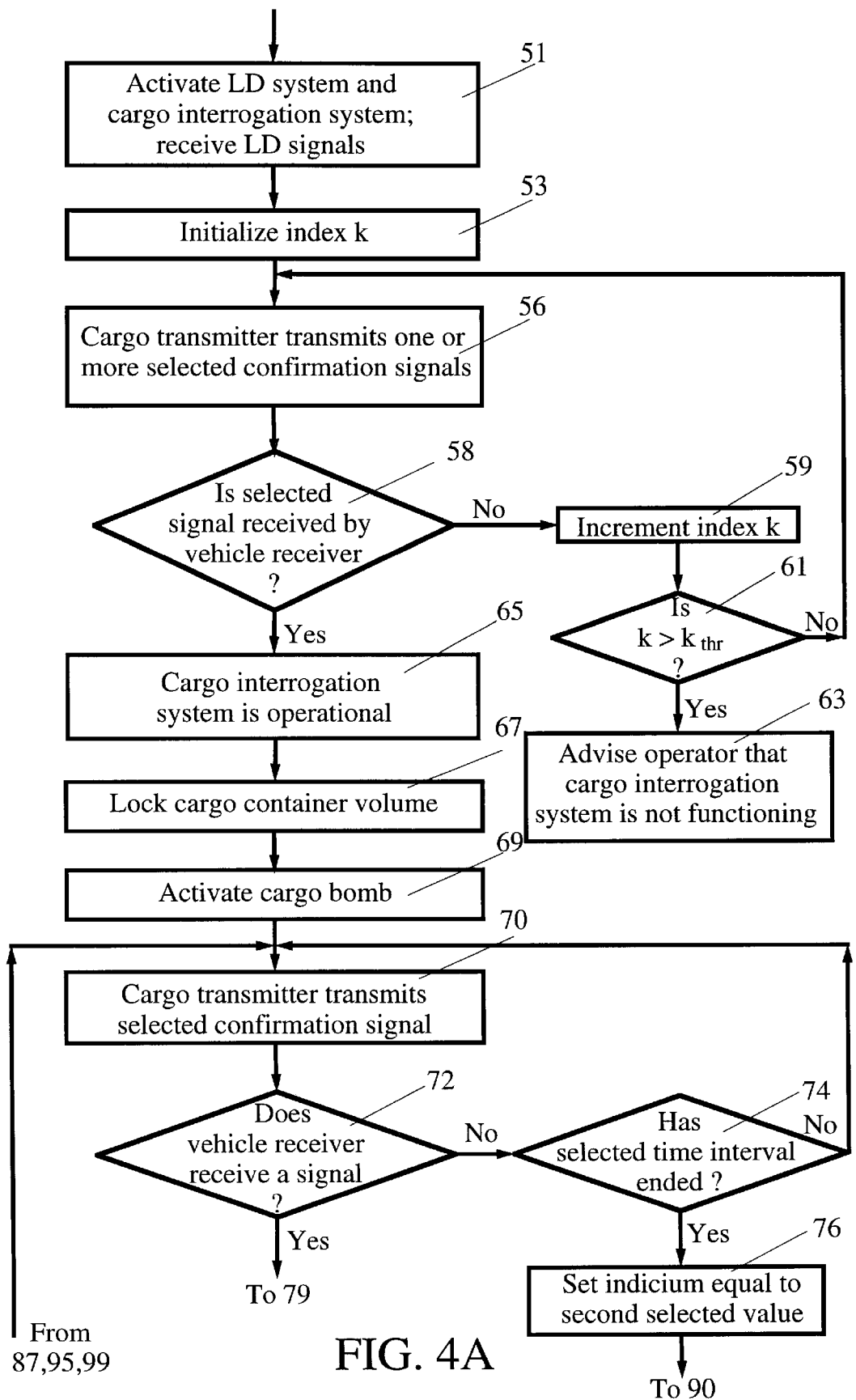
Figure 4B:
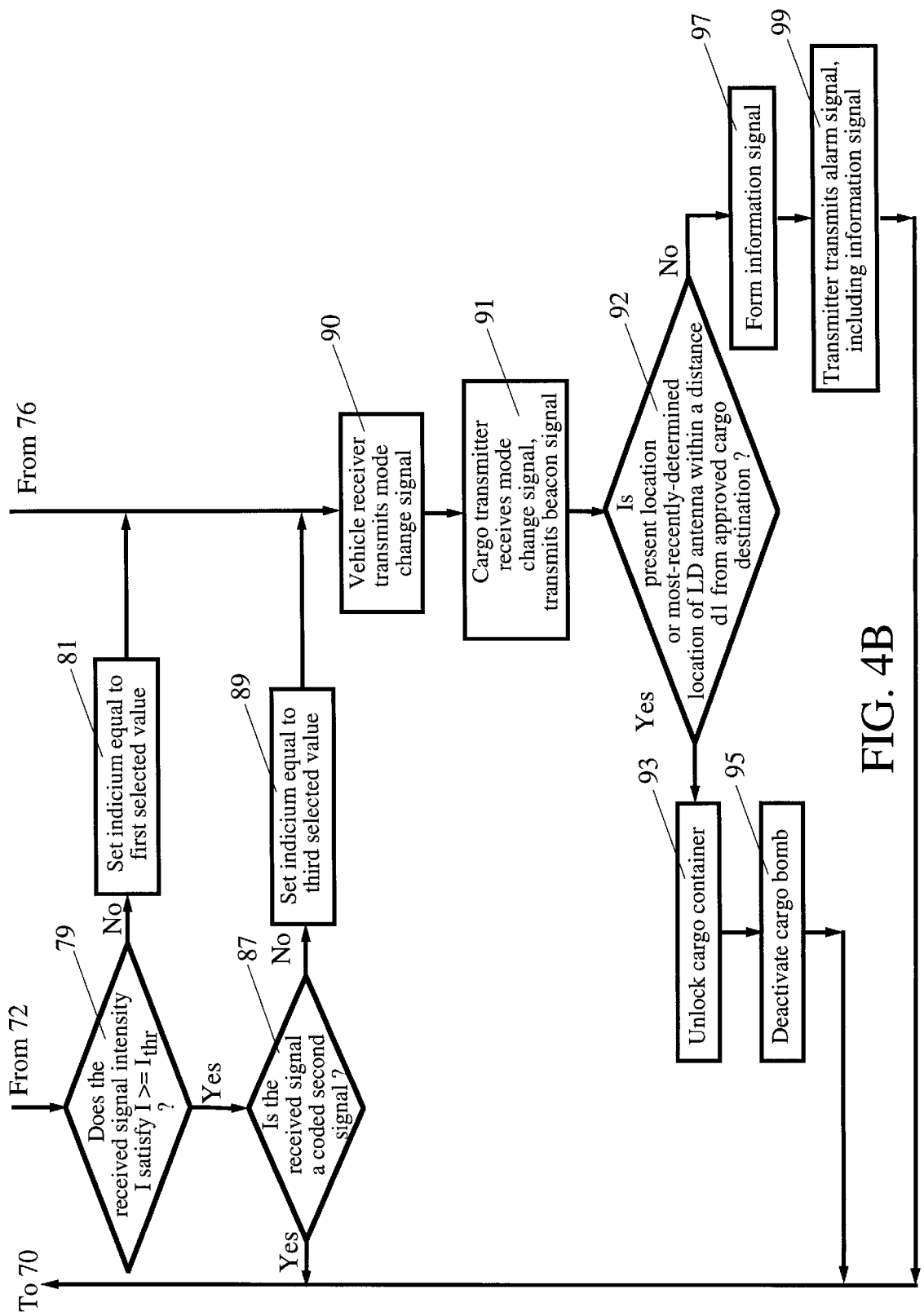

FIGS. 4A and 4B illustrate this alternative, non-polling approach for cargo security in flow chart form. The steps 51, 53, 59, 61, 63, 65, 67, 69, 79, 81, 87, 89, 90, 91, 92, 93, 95, 97 and 99 in FIGS. 4A and 4B are as in FIGS. 3A and 3B. The sequence of steps 55 and 57 in FIGS. 3A and 3B is replaced by the sequence of steps 56 and 58 in FIGS. 4A and 4B. In step 56, the cargo transmitter transmits one or more selected confirmation signals. In step 58, the vehicle receiver monitors the airwaves and determines if the receiver has received the selected confirmation signal. If the answer to the question in step 58 is "no," the system proceeds through steps 59, 61 and 63, as in FIG. 3A. If the answer to the question in step 58 is "yes," the system proceeds to step 65, as in FIG. 3A.

The sequence of steps 71, 73, 75, 77, 83 and 85 in FIGS. 3A/3B is replaced by the sequence of steps 70, 72, 74 and 76 in FIGS. 4A/4B. In step 70, the cargo transmitter transmits a selected confirmation signal, at one or more selected times or continuously. In step 72, the system determines whether the vehicle receiver has received the selected confirmation signal, either at one or more fixed times or at one or more randomly determined times within a selected time interval. If the answer to the question in step 72 is "no," the system determines, in step 74, whether the selected time interval has ended. If the answer to the question in step 74 is "no," the system recycles and returns to step 70 or step 72. If the answer to the question in step 74 is "yes," the system sets an indicium equal to a second selected value, in step 76, and proceeds to step 90 (or to step 92), as in FIGS. 3A/3B. If the answer to the question in step 72 is "yes," the system proceeds to step 79, as in FIGS. 3A/3B.

Figure 5A:
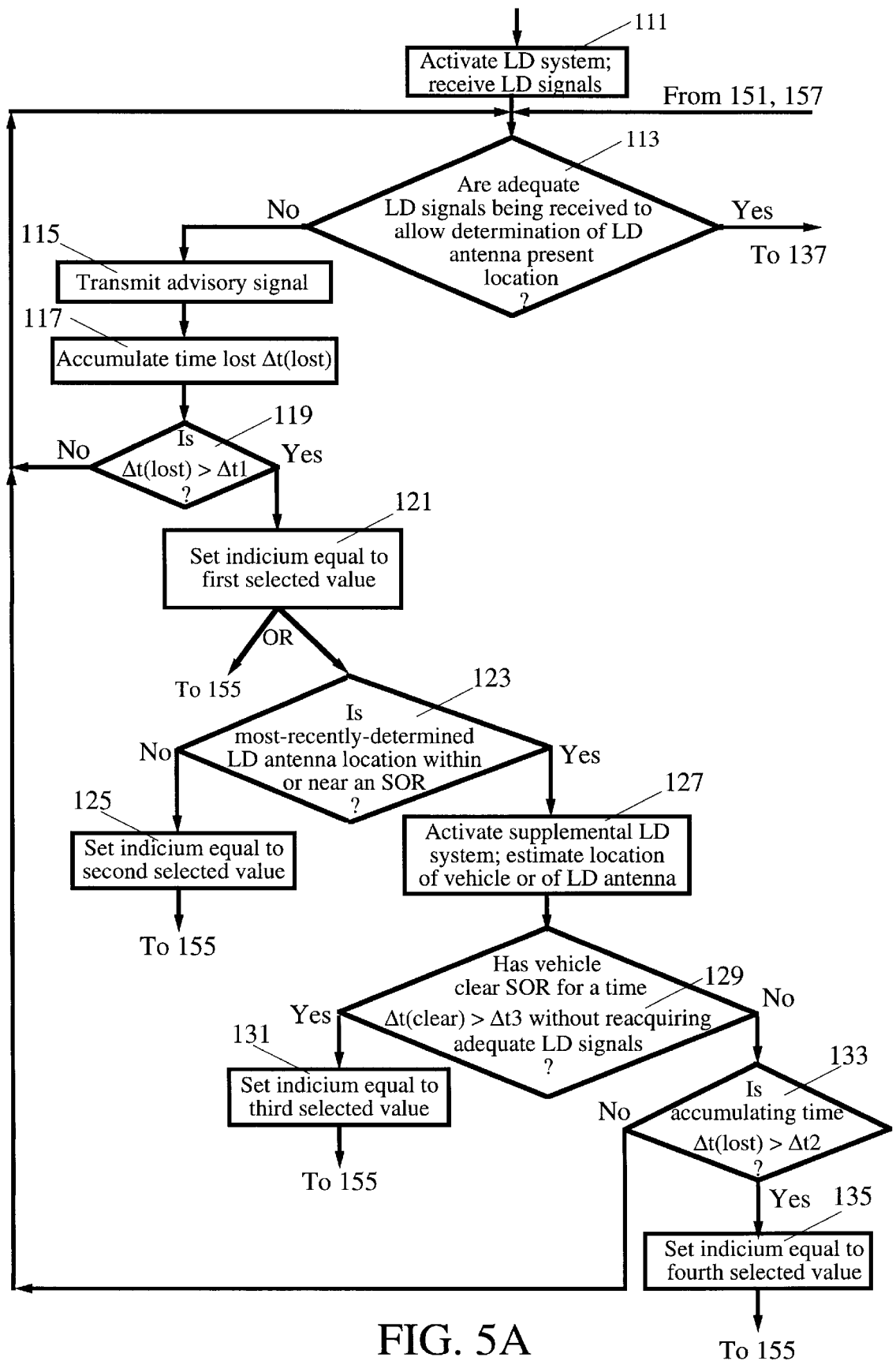
Figure 5B:
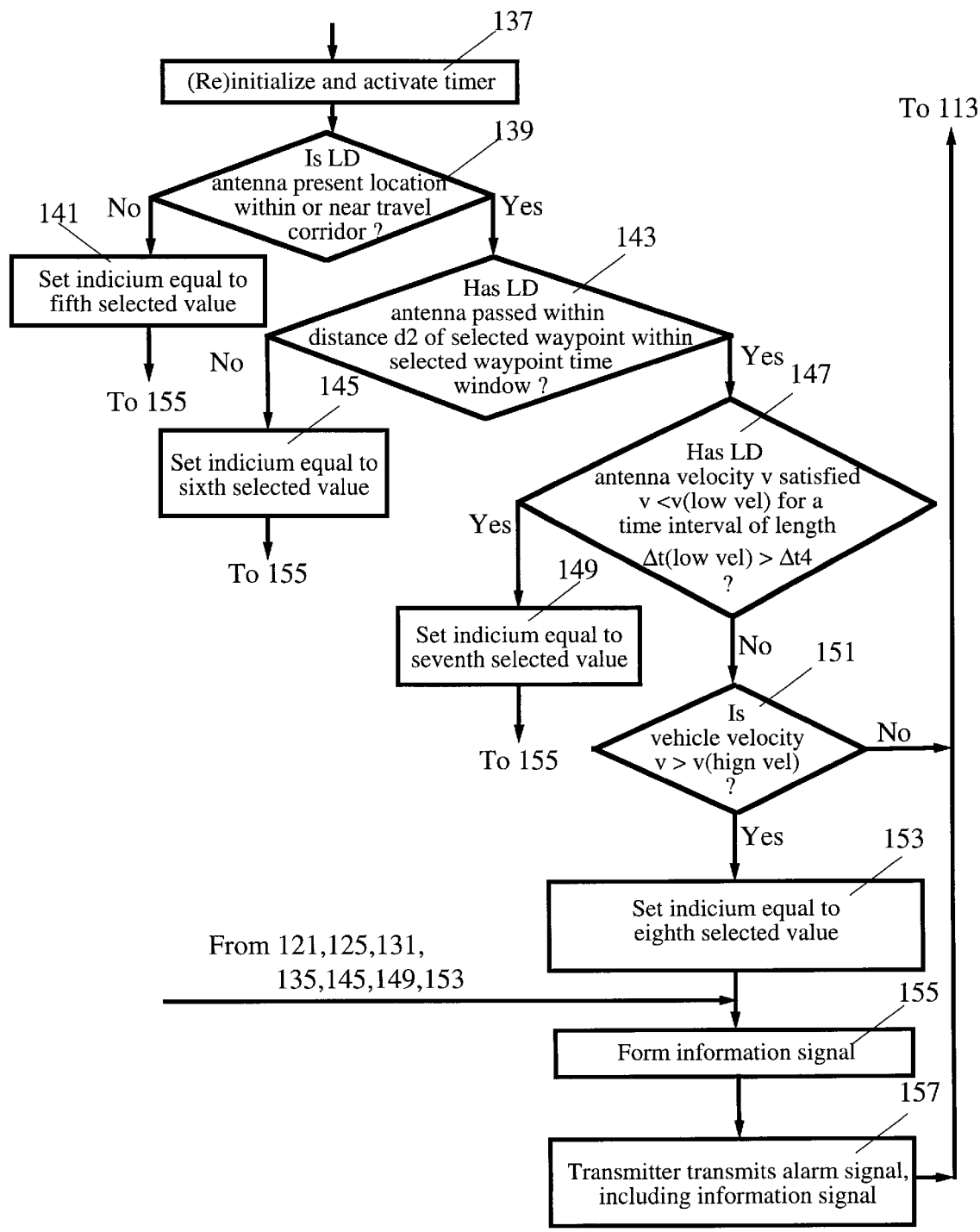

FIG. 5 illustrates, in flow chart form, a second embodiment of the invention, for vehicle security. In step 111, the LD system is activated and begins receiving LD signals. In step 113, the LD system determines if the LD antenna is receiving sufficient LD signals (with sufficient signal definition) to allow determination of the present location of the LD antenna? This condition might be violated: (1) when the LD system is initially powered up and adequate LD signals are not yet being received; (2) when the LD system temporarily or permanently loses "lock" on one or more of the signals the LD system is relying upon to allow determination of the LD antenna location, because of transient signal propagation conditions or because the vehicle is passing through or near an SOR; or (3) when the LD system itself is malfunctioning.

If the answer to the question in step 113 is "no," an advisory signal is transmitted to the central station, in step 115 (optional), and a timer in the LD system begins to accumulate signal-lost-time with a variable $\Delta t(lost)$, in step 117. In step 119, the system determines if $\Delta t(lost)$ is greater than a selected first positive time increment $\Delta t1$?. If the answer to the question in step 119 is "no," the system recycles to step 113.

If the answer to the question in step 119 is "yes," the system optionally sets an indicium (optionally, the same indicium as in one or more of steps 81, 85 and/or 89 in FIGS. 3A and 3B) equal to a first selected value, in step 121, and the system proceeds to step 155.

Preferably, if the answer to the question in step 119 is "yes," the system proceeds to step 123 and determines if the most-recently determined LD antenna location is within or near the range of location coordinates of at least one of the SORs? If the answer to the question in step 123 is "no," an indicium is optionally set equal to a second selected value, in step 125, and the system proceeds to step 155.

If the answer to the question in step 125 is "yes," the system proceeds to step 127 and activates a supplemental LD system that does preferably does not require receipt of electromagnetic waves from spaced apart signal sources for its operation. The supplemental LD system can be a dead reckoning system or a magnetic field-sensing system that uses local magnetic field strengths and directions to estimate the present location of one or more field sensors. Preferably, the supplemental LD system is an inertial system that receives signals from a supplemental vehicle speedometer and/or odometer and from two or more accelerometers (preferably hidden on the vehicle) to estimate and integrate the vehicle velocity vector and to thereby estimate the present location of the vehicle.

When the supplemental LD system indicates that the vehicle is now outside the SOR, a timer optionally begins to accumulate the length of time Δt(clear) the vehicle has "cleared" the SOR. If Δt(clear) becomes greater than a selected time increment Δt3 and the LD system has not begun receiving adequate LD signals, in step 129, an indicium is set equal to a third selected value, in step 131, and the system proceeds to step 155.

Alternatively, steps 127, 129 and 131 are ignored or deleted. The system then proceeds from a "yes" answer in step 123 to step 133 and determines if the accumulated time Δt(lost) is greater than a second selected time increment Δt2? If the answer to the question in step 133 is "no," the system recycles to step 113. If the answer to the question in step 133 is "yes," an indicium is set equal to a fourth selected value, in step 135, and the system optionally proceeds to step 155.

In a second alternative, the steps 127, 129 and 131 and the steps 133 and 135 can be combined to provide two parallel tests for when the LD system should begin receiving LD signals that are adequate to allow the LD system to again begin determining the present location of the LD antenna.

Thus far, the LD system has determined that inadequate LD signals are being received to allow determination of the LD antenna location, that the vehicle and LD antenna are, or are not, passing through an SOR, that a selected upper bound, Δt1 or Δt2 for the accumulation time Δt(lost), or a selected upper bound Δt3 for the accumulation time Δt(clear), is, or is not, exceeded, and/or that the vehicle has, or has not yet, moved beyond the SOR.

If the answer to the question in step 113 is "yes," the system (re)initializes and deactivates the timer, in step 137, and proceeds to step 139, where the system determines if the LD antenna location is within or near a travel corridor TC defining and surrounding an approved route that the vehicle is to travel? If the answer to the question in step 139 is "no,", the system sets an indicium equal to a fifth selected value, in step 141, and proceeds to step 155. Steps 137, 139 and 141 are optional and are used only if vehicle adherence to a specified route or travel corridor is monitored.

Alternatively, or in addition to the steps 137, 139 and 141, if the answer to the question in step 139 is "yes "the system, in step 143, determines if the LD antenna location has passed within a selected distance d2 from a selected waypoint location and within a selected waypoint time window? If the answer to the question in step 143 is "no," the system sets an indicium equal to a sixth selected value, in step 145, and proceeds to step 155.

If the answer to the question in step 143 is "yes," the system proceeds to step 147 and determines if the estimated velocity v of the LD antenna or of the vehicle has satisfied v<v(lowvel) for a continuous, accumulated time increment Δt(lowvel) that satisfies Δt(lowvel)>Δt4? Here, v(lowvel) is a selected positive, low velocity threshold (e.g., v(lowvel)= 0.1–10 meters/sec) and Δt4 is a selected positive time increment (e.g., Δt4=1–30 min). If the answer to the question in step 147 is "yes," an indicium is set equal to a seventh selected value, in step 149, and the system proceeds to step 155. Steps 147 and 149 are optional and are used only if the condition v<v(lowvel) for a time interval of length exceeding Δt4 is taken to indicate that the vehicle likely is being, or has been, off-loaded. The time increment Δt4 could be set to allow for short interval vehicle stops at traffic stop lights, railroad crossings and the like and to allow the vehicle operator to take short interval personal needs breaks. For a longer time interval, such as a meal break, the operator should preferably transmit an advisory signal indicating that the vehicle will be stopped for this longer time interval.

If the answer to the question in step 147 is "no," the system determines, in step 151, if the vehicle velocity magnitude v of the LD antenna or of the vehicle satisfies v>v(highvel), where v(highvel) is a selected upper bound on the vehicle velocity? If the answer to the question in step 151 is "no," the system recycles to step 113. If the answer to the question in step 151 is "yes," the system sets an indicium equal to a selected eighth value, in step 153, and the system proceeds to step 155.

In step 155, the transmitter receives an indicium (or indicia) with one or more of the first, second, third, fourth, fifth, sixth, seventh and eighth selected values and forms an information signal including at least one of (1) the indicium value(s) and (2) the present location (if available) or the most-recently-determined location of the LD antenna (or vehicle). In step 157, an alarm signal, including the information signal, is transmitted to the central station for appropriate response.

Initially, an indicium should have a value that is distinguishable from any of the selected first, second, third, fourth, fifth, sixth, seventh and eighth indicium values. Two or more of the first, second, third, fourth, fifth, sixth, seventh and eighth indicium values may be identical. Alternatively, a single indicium may be used for two or more (or all) of the (distinguishable) first, second, third, fourth, fifth, sixth, seventh and eighth indicium values.

Each of the alarm signals preferably includes the location coordinates of the present location or a most-recently-determined location of the LD antenna (or vehicle) and (optionally) at least one of the selected indicium values so that local law enforcement representatives or other persons can be promptly dispatched to this reported location. Two or more of the selected indicium values may be identical, if distinction between the conditions examined in steps 119, 123, 129, 133, 139, 143, 147 and/or 151 is not important for purposes of responding to receipt of an alarm signal.

The invention optionally distinguishes between unauthorized off-loading of a cargo unit from a vehicle 11, unauthorized stopping of the vehicle and cargo, and unauthorized diversion of the vehicle and/or cargo.

The vehicle 11 can also be provided with apparatus to respond to polling by radio waves and to transmit its present location or most-recently-determined location to the central station 41 upon request. If the vehicle 11 and/or one or more of its cargo units 33-x are being hijacked and/or diverted, the LD antenna 15, the LD receiver/processor 17, the transmitter 21 and associated antenna 23 can track and report the present location of the vehicle.

Figure 6:
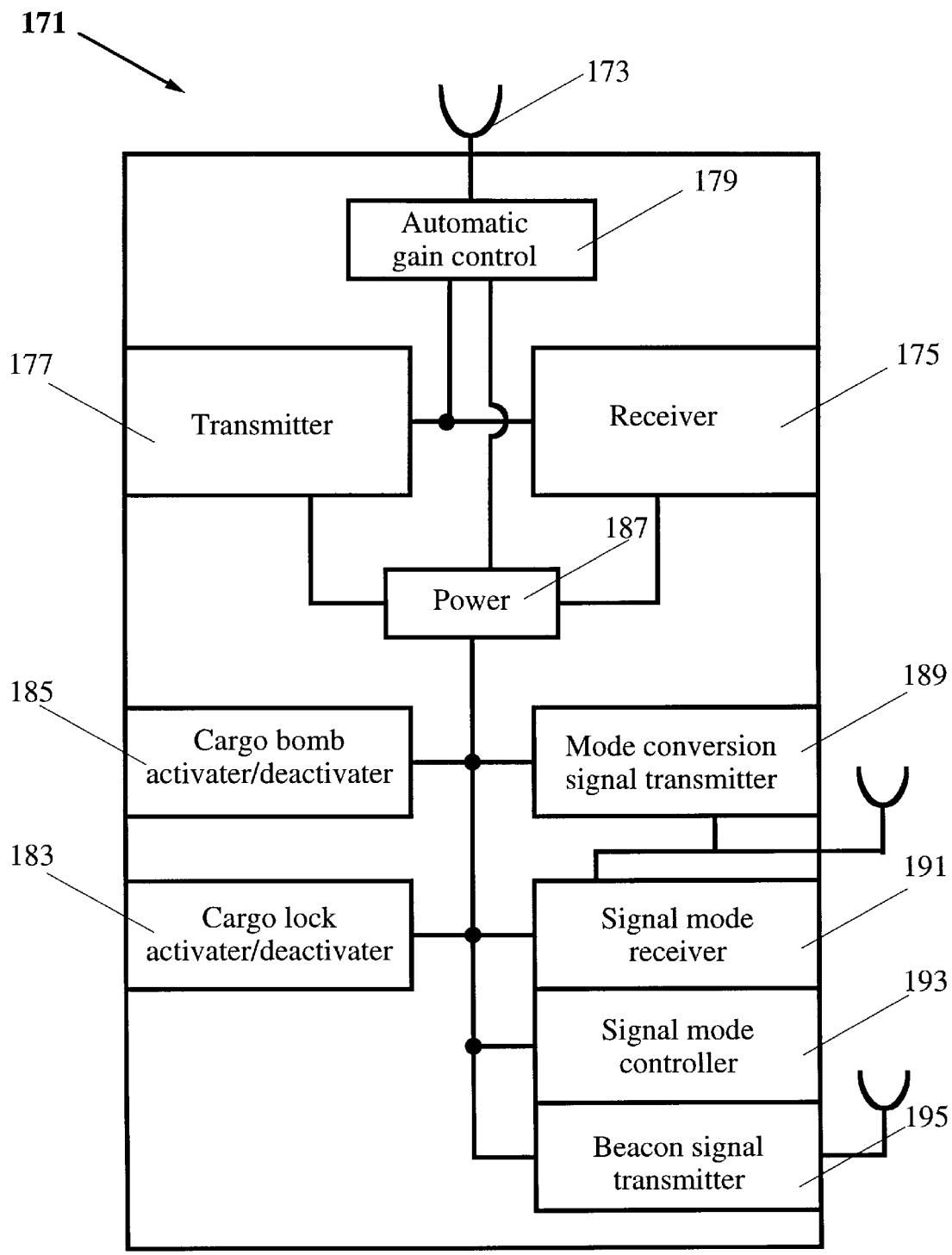
FIG. 6 illustrates transceiver apparatus for practising the invention.

FIG. 6 is a schematic view of transceiver apparatus that is suitable for use for the first transceiver 35 and/or for the second transceiver 37-x indicated in FIG. 2. The apparatus 171 includes a communications antenna 173 that is connected to a receiver 175 and/or to a transmitter 177, an optional automatic gain control module 179, an LD communication module 181 (included in the first transceiver only) for exchanging information with the LD receiver/processor 17 in FIG. 2, a cargo container lock module 183, a cargo bomb activation/deactivation module 185, and a power supply 187 that is connected to at least one of the other components shown in FIG. 6. The first transceiver (or vehicle receiver) optionally includes a mode conversion signal transmitter 189 that transmits a mode conversion signal with reasonably high signal strength to the second transceiver (or cargo transmitter) 37-x, if one or more of the questions in steps 76, 81, 85 and 89 in FIGS. 3A/3B or 4A/4B is answered "no." The second transceiver (or cargo transmitter) 37-x optionally includes a signal mode conversion receiver 191 that receives the mode conversion signal, a signal mode controller 193 and a beacon signal transmitter 195 that transmits a high signal strength beacon signal when the mode conversion signal is received and the signal mode controller converts the transceiver/transmitter 37-x to a beacon signal mode.

The transmitter 21 shown in FIG. 2 may be part of a cellular communications apparatus that communicates (1) using a conventional cellular channel (with bandwidth≈50 kHz) or (2) using one of the small number of supervisory cellular channels (with bandwidth≈5 kHz) that are provided for every cellular zone. One advantage of using a cellular supervisory channel is that such a channel is more likely to be immediately available when the channel is needed to carry an advisory signal or an alarm signal. The advisory signal can include an indicium indicating that receipt of adequate LD signals to allow determination of the present location of the LD antenna 15 has been (temporarily) lost. The alarm signal can include 1–11 indicia that indicate violation of one or more of the 11 conditions discussed in connection with FIGS. 3A, 3B, 4A, 4B and 5.

Alternatively, the transmitter 21 may be a pager/communicator that provides one-way or two-way communication with the central station 41. with this approach, the pager may be configured to transmit a signal, having a first indicium to represent an advisory signal indicating that receipt of adequate LD signals has been (temporarily) lost, and having 1–11 other indicia to indicate violation of one or more of the 11 conditions discussed in connection with FIGS. 3A, 3B, 4A, 4B and 5.

We claim:

1. A method for providing security for a cargo unit transported by a vehicle, the method comprising the steps of:

causing a first transmitter, carried on a selected cargo unit in a cargo container volume on a vehicle, to transmit a first selected signal;

monitoring a signal receiver that is spaced apart from the first transmitter, to determine if the first selected signal is received at the receiver;

when the first selected signal is received at the receiver, examining the selected signal;

when the first selected signal, as received at the receiver, satisfies a selected condition, accepting the selected signal;

when the first selected signal, as received at the receiver, does not satisfy the selected condition, determining the present location of the vehicle and comparing the vehicle present location with the location of at least one selected cargo destination; and when the first selected signal, as received at the receiver, does not satisfy the selected condition and the vehicle present location is not within a selected distance from at least one approved cargo destination, causing a second transmitter, which may coincide with the first transmitter, to transmit a selected alarm signal to a selected central station.

2. The method of claim 1, further comprising the step of including in said selected alarm signal an information signal that includes at least one of: (i) said vehicle present location and (ii) an indicium indicating said selected condition that is not satisfied by said first selected signal.

3. The method of claim 1, further comprising the step of:

when said first selected signal is not received at said receiver, transmitting a selected advisory signal to said selected central station.

4. The method of claim 3, further comprising the step of including in said selected advisory signal a second information signal that includes at least one of: (i) said present location of said vehicle and (ii) an indicium indicating that said selected signal was not received by said selected receiver.

5. The method of claim 1, further comprising the steps of:

when said first selected signal is not received at said receiver, determining said vehicle present location and comparing said vehicle present location with said location of at least one selected cargo destination; and when said vehicle present location is not within said selected distance from at least one approved cargo destination, transmitting a second selected advisory signal to said central station.

6. The method of claim 1, wherein said step of causing said first transmitter to transmit said selected signal comprises the steps of:

providing a transceiver as said first transmitter for said first selected signal;

transmitting a second selected signal at a first selected time that can be received by the transceiver; and when the transceiver receives the second selected signal, causing the transceiver to transmit said first selected signal at a second selected time that is determined with reference to the first selected time.

7. The method of claim 6, further comprising the step of choosing said selected condition to be satisfaction of at least one of the following signal conditions:

(i) said first selected signal is received at said receiver within a selected time interval after said second selected signal is received by said transceiver;

(ii) said first selected signal has at least one signal portion that includes a selected signal coding; and (iii) said first selected signal is received at said receiver with a signal intensity at least equal to a selected threshold signal intensity.

8. The method of claim 6, further comprising the step of providing at least one of said first selected signal and said second selected signal with a selected indicium that indicates said selected cargo unit having said transceiver.

9. The method of claim 1, further comprising the steps of:

when said first selected signal is not received at said receiver, transmitting a mode change signal that can be received by said transmitter; and when said transmitter receives the mode change signal, causing said transmitter to transmit a beacon signal that can be received by at least one receiver that is spaced apart from said transmitter.

10. The method of claim 9, further comprising the steps of:

receiving and analyzing said beacon signal; and estimating the location of said transmitter from said beacon signal.

11. The method of claim 1, further comprising the step of providing said first selected signal with a selected indicium that indicates said selected cargo unit having said transmitter.

12. The method of claim 1, further comprising the step of choosing said selected condition to be satisfaction of at least one of the following signal conditions:

(i) said first selected signal is received at said receiver within a selected time interval;

(ii) said selected signal has at least one signal portion that includes a selected signal coding; and (iii) said first selected signal is received at said receiver with a signal intensity at least equal to a selected threshold signal intensity.

13. The method of claim 1, further comprising the step of:

when said first selected signal, as received at said receiver, does not satisfy said selected condition and said vehicle present location is within said selected distance from at least one selected cargo destination, causing said receiver to take at least one of the following actions: (i) accepting said selected signal at said receiver and (ii) ignoring said selected signal at said receiver.

14. The method of claim 1, further comprising the steps of:

locking said cargo unit in a cargo-carrying volume carried on said vehicle, when said vehicle leaves a selected location;

determining said vehicle present location at least once after said vehicle leaves the selected location; and unlocking the cargo-carrying volume only if at least one of the following locations is within said selected distance from at least one approved cargo destination location: (i) said vehicle present location and (ii) a recently determined location of said vehicle.

15. The method of claim 1, further comprising the steps of:

providing a cargo bomb for a selected cargo unit;

activating a cargo bomb, carried on the selected cargo unit, when said vehicle leaves a selected location; and determining said vehicle present location at least once after said vehicle leaves the selected location; and causing the cargo bomb to detonate when said first selected signal, as received at said receiver, does not satisfy said selected condition and at least one of (i) said vehicle present location and (ii) a recently determined location of said vehicle, is not within said selected distance of said location of at least one approved cargo destination.

16. The method of claim 15, further comprising the step of:

deactivating said cargo bomb only if said cargo bomb has not been previously detonated and at least one of the following locations is within said selected distance from at least one approved cargo destination location: (i) said vehicle present location and (ii) a recently determined location of said vehicle.

17. The method of claim 1, wherein said step of determining said vehicle present location comprises:

receiving location determination (LD) signals at an LD signal receiver/processor carried on said vehicle from at least one LD signal source that is spaced apart from said vehicle; and using the received LD signals to determine said vehicle present location.

18. The method of claim 17, further comprising the steps of:

using a timer to accumulate a timer length $\Delta t(lost)$ of a continuous time interval, during which adequate LD signals that allow determination of said vehicle present location are not received at said vehicle;

providing said LD receiver/processor with a range of location coordinates that represents at least one signal obstructing region (SOR), in which said LD signal received by said LD receiver/processor from at least one of said LD signal sources is likely to be interfered with by at least one structure located within or adjacent to the SOR;

when said LD receiver/processor begins to receive said LD signals that allow said LD receiver/processor to determine said vehicle present location before the timer has accumulated timer length $\Delta t(lost)$ greater than a first positive selected time length $\Delta t1$, reinitializing the timer, and allowing said LD receiver/processor to continue to receive said LD signals and to determine said vehicle present location and to store at least one recently determined location of said vehicle;

when the timer has accumulated timer length $\Delta t(lost)$ greater than $\Delta t1$, comparing location coordinates of a recently determined location of said vehicle with a range of location coordinates of at least one selected SOR; and when the recently determined location coordinates of said vehicle are not within the range of location coordinates of the selected SOR, delivering to said second transmitter a third information signal, including at least one of (i) an indicium indicating that $\Delta t(lost)>\Delta t1$ and that said vehicle is not within an SOR and (ii) said present location or a recently determined location of said vehicle.

19. The method of claim 18, further comprising the step of transmitting a third alarm signal when said second transmitter receives said third information signal.

20. The method of claim 18, further comprising the steps of:

when said recently determined location coordinates of said vehicle are found to be within said range of location coordinates of said selected SOR, allowing said timer to continue accumulate said timer length $\Delta t(lost)$;

when said recently determined location coordinates of said vehicle are not found to be within said range of location coordinates of said selected SOR, and said LD receiver/processor begins to receive said LD signals that allow said LD receiver/processor to determine said present location of said vehicle before said timer length $\Delta t(lost)$ has become greater than a selected second time length $\Delta t2$ (>0), reinitializing said timer and allowing said LD receiver/processor to continue to receive said LD signals and to determine said vehicle present location; and when said timer has accumulated timer length greater than $\Delta t2$, and said LD receiver/processor has not begun to receive adequate LD signals that allow said LD receiver/processor to determine said present location of said vehicle, delivering to said second transmitter a fourth information signal, including at least one of (i) an indicium indicating that $\Delta t(lost)>\Delta t2$ and (ii) said present location or a recently determined location of said vehicle.

21. The method of claim 20, further comprising the step of transmitting a fourth alarm signal when said second transmitter receives said fourth information signal.

22. The method of claim 18, further comprising the steps of:

causing said vehicle to use a supplemental LD system that receives and analyzes signals from a supplemental LD signal source and that estimates the present location of said vehicle from the supplemental LD signals; and when said LD system does not receive adequate LD signals that allow said LD receiver/processor to determine said vehicle present location, using the supplemental LD system to estimate said vehicle present location.

23. The method of claim 22, further comprising the steps of:
  providing said LD receiver/processor with a range of location coordinates that represents at least one signal obstructing region (SOR), in which an LD signal received by said LD receiver/processor from at least one of said LD signal sources is likely to be interfered with by at least one structure located within or adjacent to the SOR; and
  when said LD receiver/processor does not receive adequate LD signals that allow said LD receiver/processor to determine said vehicle present location, and said recently determined location coordinates of said vehicle are found to be within the range of location coordinates of at least one selected SOR, using said supplemental LD system to estimate said vehicle present location until said LD receiver/processor receives adequate LD signals that allow said LD receiver/processor to determine said vehicle present location.

24. The method of claim 22, further comprising the steps of:
  using a timer to accumulate a timer length $\Delta t(clear)$ of a continuous time interval, during which said vehicle present location, as determined by said supplemental LD system, is no longer within said selected SOR and during which said LD receiver/processor does not receive adequate LD signals that allow said LD receiver/processor to determine said vehicle present location;
  when said LD receiver/processor begins to receive said adequate LD signals that allow said LD receiver/processor to determine said vehicle present location, before the timer has accumulated timer length $\Delta t(clear)$ greater than a selected time length $\Delta t3$ (>0), reinitializing the timer, and allowing said LD receiver/processor to continue to receive said LD signals and to determine said vehicle present location and to store at least one recently determined location of said vehicle; and
  when the timer has accumulated time timer length $\Delta t(clear)$ greater than $\Delta t3$, delivering to said second transmitter a fifth information signal, including at least one of (i) an indicium indicating that $\Delta t(clear) > \Delta t3$ and (ii) at least one of said present location and a recently determined location of said vehicle.

25. The method of claim 24, further comprising the step of transmitting an alarm signal when said second transmitter receives said fifth information signal.

26. The method of claim 17, further comprising the step of providing said LD receiver/processor with a range of location coordinates for a selected travel corridor within which said vehicle will travel.

27. The method of claim 26, further comprising the steps of:
  when said LD receiver/processor begins to receive said LD signals that allow said LD receiver/processor to determine said vehicle present location, determining if said vehicle present location is within said travel corridor;
  when said vehicle present location is within said travel corridor, allowing said LD receiver/processor to continue to receive said LD signals and to determine said vehicle present location and to store at least one recently determined location of said vehicle; and
  when said vehicle present location is not within said travel corridor, delivering to said second transmitter a sixth information signal, including at least one of (i) an indicium indicating that said vehicle is not within said travel corridor and (ii) said present location or a recently determined location of said vehicle.

28. The method of claim 27, further comprising the step of transmitting an alarm signal when said second transmitter receives said sixth information signal.

29. The method of claim 17, further comprising the step of providing said LD receiver/processor with location coordinates for a selected waypoint that said vehicle will pass, if said vehicle travels along a selected route.

30. The method of claim 29, further comprising the step of providing said LD receiver/processor with a time of observation of said vehicle present location and with an estimated time $t_{waypt}$ that said vehicle will pass said selected waypoint, if said vehicle travels along said selected route.

31. The method of claim 30, further comprising the steps of:
  when said LD receiver/processor begins to receive said LD signals that allow said LD receiver/processor to determine said vehicle present location, determining if said vehicle present location is within a second selected distance from said waypoint for at least one observation time for said vehicle present location within a second selected time interval that includes said estimated time $t_{waypt}$;
  when said vehicle present location is within the second selected distance from said waypoint for at least one observation time within the second selected time interval, allowing said LD receiver/processor to continue to receive said LD signals and to determine said vehicle present location and to store at least one recently determined location of said vehicle; and
  when said vehicle present location is not within the second selected distance from said waypoint for at least one observation time within the second selected time interval, delivering to said second transmitter a seventh information signal, including at least one of (i) an indicium indicating that said vehicle is not within said travel corridor and (ii) said present location or a recently determined location of said vehicle.

32. The method of claim 31, further comprising the step of transmitting an alarm signal when said second transmitter receives said seventh information signal.

33. The method of claim 17, further comprising the steps of:
  estimating present velocity v of said vehicle, and comparing the vehicle velocity with a selected low velocity threshold v(lowvel);
  causing a timer to accumulate a timer length $\Delta t(lowvel)$ of a selected continuous time interval;
  when the vehicle velocity v satisfies v<v(lowvel), causing the timer to accumulate a timer length $\Delta t(lowvel)$ of a continuous time interval, during which the vehicle velocity satisfies v<v(lowvel);
  when the vehicle velocity v becomes at least equal to v(lowvel) before the timer length $\Delta t(lowvel)$ has become greater than a selected time increment $\Delta t4$, (>0) reinitializing the timer and allowing said LD receiver/processor to continue to receive said LD signals and to determine said vehicle present location; and
  when the timer length $\Delta t(lowvel)$ becomes greater then $\Delta t4$ before the vehicle velocity v becomes at least equal to v(lowvel), delivering to said second transmitter an eighth information signal, including at least one of (i) an indicium indicating that $\Delta t(lowvel) > \Delta t4$ and (ii) said present location or a recently determined location of said vehicle.

34. The method of claim 33, further comprising the step of transmitting an alarm signal when said second transmitter receives said eighth information signal.

35. The method of claim 17, further comprising the steps of:
estimating present velocity v of said vehicle, and comparing the vehicle velocity with a selected high velocity threshold v(highvel); and
when the vehicle velocity v satisfies v>v(highvel), delivering to said second transmitter a ninth information signal, including at least one of (i) an indicium indicating that v>v(highvel) and (ii) said present location or a recently determined location of said vehicle.

36. The method of claim 35, further comprising the step of transmitting an alarm signal when said second transmitter receives said ninth information signal.

37. The method of claim 17, further comprising the step of selecting said LD signals from a group of electromagnetic signals comprising GPS signals, GLONASS signals, LORAN signals, Tacan signals, Decca signals, JTIDS Relnav signals and PLRS signals.

38. Apparatus for providing security for a cargo unit transported by a vehicle, the apparatus comprising:
a first transmitter, carried on a selected cargo unit on a vehicle, that can transmit a selected signal;
a second transmitter, which may coincide with the first transmitter, that can transmit an alarm signal;
location determination (LD) means, carried on the vehicle, for determining the present location of the vehicle;
a receiver/processor (R/P) that is spaced apart from the transmitter, that is located on the vehicle, that contains the location coordinates of at least one selected cargo destination, and that is capable of receiving and examining the selected signal so that:
when the selected signal, as received at the R/P, satisfies a selected condition, the R/P accepts the selected signal;
when the selected signal, as received at the R/P, does not satisfy the selected condition, the R/P compares the vehicle present location with the location of at least one selected cargo destination; and
when the selected signal, as received at the R/P, does not satisfy the selected condition and the vehicle present location is not within a selected distance from at least one approved cargo destination, the R/P causes the second transmitter to transmit a selected alarm signal to a selected central station.

39. The apparatus of claim 38, wherein said selected alarm signal includes an information signal that includes at least one of: (i) said vehicle present location and (ii) an indicium indicating said selected condition that is not satisfied by said first selected signal.

40. The apparatus of claim 38, wherein:
when said first selected signal is not received at said receiver, transmitting a selected advisory signal to said selected central station.

41. The apparatus of claim 40, wherein said selected advisory signal includes a second information signal that includes at least one of: (i) said present location of said vehicle and (ii) an indicium indicating that said selected signal was not received by said selected receiver.

42. The apparatus of claim 38, wherein:
when said first selected signal is not received at said receiver, said vehicle present location is determined and compared with said location of at least one selected cargo destination; and
when said vehicle present location is not within said selected distance from at least one approved cargo destination, a second selected alarm signal is transmitted to said central station.

43. The apparatus of claim 38, wherein said first transmitter for said selected signal is a transceiver and the apparatus further comprises:
a third transmitter, which may coincide with said second transmitter, located on said vehicle, that transmits a second selected signal; and
when the transceiver receives the second selected signal, the transceiver transmits said first selected signal.

44. The apparatus of claim 43, wherein said selected condition includes satisfaction of at least one of the following three signal conditions:
(i) said first selected signal is received at said receiver within a selected time interval after said second selected signal is received by said transceiver;
(ii) said first selected signal has at least one signal portion that includes a selected signal coding; and
(iii) said first selected signal is received at said receiver with a signal intensity at least equal to a selected threshold signal intensity.

45. The apparatus of claim 43, wherein at least one of said first selected signal and said second selected signal includes a selected indicium that indicates said selected cargo unit having said first transceiver.

46. The apparatus of claim 38, wherein:
when said first selected signal is not received at said receiver, a mode change signal is transmitted that can be received by said transmitter; and
when said transmitter receives the mode change signal, said transmitter transmits a beacon signal that can be received by at least one receiver that is spaced apart from said transmitter.

47. The apparatus of claim 46, wherein said beacon signal is received and analyzed and the location of said transmitter is estimated from said beacon signal.

48. The apparatus of claim 38, wherein said selected signal includes a selected indicium that identifies said selected cargo unit having said transmitter.

49. The apparatus of claim 38, wherein said selected condition includes satisfaction of at least one of the following signal conditions:
(i) said first selected signal is received at said receiver within a selected time interval;
(ii) said selected signal has at least one signal portion that includes a selected signal coding; and
(iii) said first selected signal is received at said receiver with a signal intensity at least equal to a selected threshold signal intensity.

50. The apparatus of claim 38, wherein:
when said first selected signal, as received at said receiver, does not satisfy said selected condition and said vehicle present location is within said selected distance from at least one selected cargo destination, said receiver takes at least one of the following actions: (i) accept said selected signal at said receiver and (ii) ignore said selected signal at said receiver.

51. The apparatus of claim 38, wherein:
said cargo unit is locked in a cargo-carrying volume carried on said vehicle, when said vehicle leaves a selected location;
said vehicle present location is determined at least once after said vehicle leaves the selected location; and the cargo-carrying volume is unlocked only if at least one of the following locations is within said selected distance from at least one approved cargo destination location: (i) said vehicle present location and (ii) a recently-determined location of said vehicle.

52. The apparatus of claim 38, wherein:

a cargo bomb is connected to at least one selected cargo unit and is activated when said vehicle leaves a selected location;

said vehicle present location is determined at least once after said vehicle leaves the selected location; and the cargo bomb is arranged to detonate when said first selected signal, as received at said receiver, does not satisfy said selected condition and at least one of (i) said vehicle present location and (ii) a recently determined location of said vehicle, is not within said selected distance from at least one approved cargo destination.

53. The apparatus of claim 52, wherein said cargo bomb is deactivated only if said cargo bomb has not been previously detonated and at least one of the following locations is within said selected distance from at least one approved cargo destination location: (i) said vehicle present location and (ii) a recently determined location of said vehicle.

54. The apparatus of claim 38, further comprising a location determination (LD) signal receiver/processor carried on said vehicle that receives location determination LD signals from at least one LD signal source that is spaced apart from said vehicle, and that uses the received LD signals to determine said vehicle present location.

55. The apparatus of claim 54, further comprising a timer that accumulates a timer length $\Delta t(lost)$ of a continuous time interval, during which adequate LD signals that allow determination of said vehicle present location are not received at said vehicle; wherein:

said LD receiver/processor contains a range of location coordinates that represents at least one signal obstructing region (SOR), in which said LD signal received by said LD receiver/processor from at least one of said LD signal sources is likely to be interfered with by at least one structure located within or adjacent to the SOR;

when said LD receiver/processor begins to receive said LD signals that allow said LD receiver/processor to determine said vehicle present location before the timer has accumulated timer length $\Delta t(lost)$ greater than a first positive selected time length $\Delta t1$, the timer is reinitialized, and said LD receiver/processor continues to receive said LD signals and to determine said vehicle present location and to store at least one recently determined location of said vehicle;

when the timer has accumulated timer length $\Delta t(lost)$ greater than $\Delta t1$, location coordinates of a recently determined location of said vehicle are compared with a range of location coordinates of at least one selected SOR; and when the recently determined location coordinates of said vehicle are not within the range of location coordinates of the selected SOR, a third information signal, including at least one of (i) an indicium indicating that $\Delta t(lost) > \Delta t1$ and that said vehicle is not within an SOR and (ii) said present location or a recently determined location of said vehicle, is delivered to said second transmitter.

56. The apparatus of claim 55, wherein a third alarm signal is transmitted when said second transmitter receives said third information signal.

57. The apparatus of claim 55, wherein:

when said recently determined location coordinates of said vehicle are found to be within said range of location coordinates of said selected SOR, said timer continues to accumulate said timer length $\Delta t(lost)$;

when said recently determined location coordinates of said vehicle are not within said range of location coordinates of said selected SOR, and said LD receiver/processor begins to receive said LD signals that allow said LD receiver/processor to determine said present location of said vehicle before said timer length $\Delta t(lost)$ has become greater than a selected second time length $\Delta t2$ ($>0$), said timer is reinitialized and said LD receiver/processor continues to receive said LD signals and to determine said vehicle present location and to store at least one recently determined location of said vehicle; and when said timer has accumulated timer length greater than $\Delta t2$, and said LD receiver/processor has not begun to receive adequate LD signals that allow said LD receiver/processor to determine said present location of said vehicle, a fourth information signal, including at least one of (i) an indicium indicating that $\Delta t(lost) > \Delta t2$ and (ii) said present location or a recently determined location of said vehicle, is delivered to said second transmitter.

58. The apparatus of claim 57, wherein a fourth alarm signal is transmitted when said second transmitter receives said fourth information signal.

59. The apparatus of claim 54, further comprising a supplemental LD system that receives and analyzes signals from a supplemental LD signal source and that estimates the present location of said vehicle from the supplemental LD signals; wherein when said LD system does not receive adequate LD signals that allow said LD receiver/processor to determine said vehicle present location, the supplemental LD system is used to estimate said vehicle present location.

60. The apparatus of claim 59, wherein:

said LD receiver/processor contains a range of location coordinates that represents at least one signal obstructing region (SOR), in which an LD signal received by said LD receiver/processor from at least one of said LD signal sources is likely to be interfered with by at least one structure located within or adjacent to the SOR; and when said LD receiver/processor does not receive adequate LD signals that allow said LD receiver/processor to determine said vehicle present location, and said recently determined location coordinates of said vehicle are within the range of location coordinates of at least one selected SOR, said supplemental LD system is used to estimate said vehicle present location until said LD receiver/processor receives adequate LD signals that allow said LD receiver/processor to determine said vehicle present location.

61. The apparatus of claim 60, further comprising a timer that accumulates a timer length $\Delta t(clear)$ of a continuous time interval, during which said vehicle present location, as determined by said supplemental LD system, is no longer within said selected SOR and during which said LD receiver/processor does not receive adequate LD signals that allow said LD receiver/processor to determine said vehicle present location; wherein:

when said LD receiver/processor begins to receive said adequate LD signals that allow said LD receiver/ processor to determine said vehicle present location, before the timer has accumulated timer length Δt(clear) greater than a selected time length Δt3 (>0), the timer is reinitialized and said LD receiver/processor continues to receive said LD signals and to determine said vehicle present location and to store at least one recently determined location of said vehicle; and when the timer has accumulated time timer length Δt(clear) greater than Δt3, a fifth information signal, including at least one of (i) an indicium indicating that Δt(clear)>Δt3 and (ii) at least one of said present location and a recently determined location of said vehicle, is delivered to said second transmitter.

62. The apparatus of claim 61, wherein an alarm signal is transmitted when said second transmitter receives said fifth information signal.

63. The apparatus of claim 54, wherein said LD receiver/processor contains a range of location coordinates for a selected travel corridor within which said vehicle will travel.

64. The apparatus of claim 63, wherein:

when said LD receiver/processor begins to receive said LD signals that allow said LD receiver/processor to determine said vehicle present location, said LD receiver/processor determines if said vehicle present location is within said travel corridor;

when said vehicle present location is within said travel corridor, said LD receiver/processor continues to receive said LD signals and to determine said vehicle present location and to store at least one recently determined location of said vehicle; and when said vehicle present location is not within said travel corridor, a sixth information signal, including at least one of (i) an indicium indicating that said vehicle is not within said travel corridor and (ii) said present location or a recently determined location of said vehicle, is delivered to said second transmitter.

65. The apparatus of claim 64, wherein an alarm signal is transmitted when said second transmitter receives said sixth information signal.

66. The apparatus of claim 54, wherein said LD receiver/processor contains location coordinates for a selected waypoint that said vehicle will pass, if said vehicle travels along a selected route.

67. The apparatus of claim 66, wherein said LD receiver/processor determines a time of observation of said vehicle present location and contains an estimated time $t_{waypt}$ that said vehicle will pass said selected waypoint, if said vehicle travels along said selected route.

68. The apparatus of claim 67, wherein:

when said LD receiver/processor begins to receive said LD signals that allow said LD receiver/processor to determine said vehicle present location, said LD receiver/processor determines if said vehicle present location is within a second selected distance from said waypoint for at least one observation time for said vehicle present location within a second selected time interval that includes said estimated time $t_{waypt}$;

when said vehicle present location is within the second selected distance from said waypoint for at least one observation time within the second selected time interval, said LD receiver/processor continues to receive said LD signals and to determine said vehicle present location and to store at least one recently determined location of said vehicle; and when said vehicle present location is not within the selected distance from said waypoint for at least one observation time within the second selected time interval, a seventh information signal, including at least one of (i) an indicium indicating that said vehicle is not within said travel corridor and (ii) said present location or a recently determined location of said vehicle, is delivered to said second transmitter.

69. The apparatus of claim 68, wherein an alarm signal is transmitted when said second transmitter receives said seventh information signal.

70. The apparatus of claim 54, further comprising a timer that accumulates a timer length Δt(lowvel) for a continuous time interval during which present velocity v of said vehicle is less than a selected low velocity threshold v(lowvel); wherein:

said LD receiver/processor estimates present velocity v of said vehicle, and compares the vehicle velocity with the threshold v(lowvel);

when the vehicle velocity v satisfies v<v(lowvel) for a continuous time interval, the timer accumulates the timer length Δt(lowvel);

when the vehicle velocity v becomes at least equal to v(lowvel) before the timer length Δt(lowvel) has become greater than a selected time increment Δt4, (>0), the timer is reinitialized said LD receiver/processor continues to receive said LD signals and to determine said vehicle present location; and when the timer length Δt(lowvel) becomes greater then Δt4 before the vehicle velocity v becomes at least equal to v(lowvel), an eighth information signal, including at least one of (i) an indicium indicating that Δt(lowvel)>Δt4 and (ii) said present location or a recently determined location of said vehicle, is delivered to said second transmitter.

71. The apparatus of claim 70, wherein an alarm signal is transmitted when said second transmitter receives said eighth information signal.

72. The apparatus of claim 54, wherein:

said LD receiver/processor estimates present velocity v of said vehicle, and compares the vehicle velocity with a selected high velocity threshold v(highvel); and when the vehicle velocity v satisfies v>v(highvel), a ninth information signal, including at least one of (i) an indicium indicating that v>v(highvel) and (ii) said present location or a recently determined location of said vehicle, is delivered to said second transmitter.

73. The apparatus of claim 72, wherein an alarm signal is transmitted when said second transmitter receives said ninth information signal.

74. The apparatus of claim 54, wherein said LD signals are selected from a group of electromagnetic signals comprising GPS signals, GLONASS signals, LORAN signals, Tacan signals, Decca signals, JTIDS Relnav signals and PLRS signals.

* * * * *